United States Patent
Bergqvist et al.

(10) Patent No.: US 9,854,574 B2
(45) Date of Patent: Dec. 26, 2017

(54) GSM EVOLUTION PACKET DATA TRAFFIC CHANNEL RESOURCE TRANSMISSION MANAGEMENT—FLEXIBLE DOWNLINK ALLOCATION TECHNIQUE

(71) Applicant: TELEFONAKTIEBOLAGET LM ERICSSON (PUBL), Stockholm (SE)

(72) Inventors: Jens Bergqvist, Linköping (SE); Mårten Sundberg, Årsta (SE); Ulf Händel, Norsholm (SE); Paul Schliwa-Bertling, Ljungsbro (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 128 days.

(21) Appl. No.: 15/007,009

(22) Filed: Jan. 26, 2016

(65) Prior Publication Data

US 2016/0219561 A1   Jul. 28, 2016

Related U.S. Application Data

(60) Provisional application No. 62/108,489, filed on Jan. 27, 2015.

(51) Int. Cl.
*H04W 4/00* (2009.01)
*H04W 72/04* (2009.01)
*H04L 5/00* (2006.01)
*H04W 74/00* (2009.01)

(52) U.S. Cl.
CPC ......... *H04W 72/042* (2013.01); *H04L 5/0055* (2013.01); *H04W 72/044* (2013.01); *H04W 72/0406* (2013.01); *H04W 74/004* (2013.01); *H04W 74/006* (2013.01); *H04W 72/048* (2013.01)

(58) Field of Classification Search
None
See application file for complete search history.

(56) References Cited

U.S. PATENT DOCUMENTS

2004/0047343 A1* 3/2004 Muniere .......... H04W 72/0413
                                                    370/352
2007/0140167 A1   6/2007 Jang et al.
2007/0265012 A1* 11/2007 Sorbara ................. H04L 12/189
                                                    455/446

(Continued)

FOREIGN PATENT DOCUMENTS

EP    2 683 183 A1      1/2014
WO    WO-2012/121776 A1  9/2012
WO    WO-2013/008208 A1  1/2013

OTHER PUBLICATIONS

Ericsson, "Cellular IoT—PDCH Resource Management", GP-140624, TSG GERAN#63, Ljubljana, Slovenia, Aug. 25-29, 2014, the whole document.

(Continued)

*Primary Examiner* — Minh-Trang Nguyen

(57) ABSTRACT

A radio access network node (e.g., Base Station Subsystem), a wireless device (e.g., a mobile station), and various methods are described herein for improving the allocation of radio resources in wireless communications. In one embodiment, the radio access network node and wireless device implement a fixed uplink allocation technique. In another embodiment, the radio access network node and wireless device implement a flexible downlink allocation technique.

24 Claims, 12 Drawing Sheets

(56) References Cited

U.S. PATENT DOCUMENTS

| | | |
|---|---|---|
| 2008/0305819 A1 | 12/2008 | Chun et al. |
| 2009/0168709 A1* | 7/2009 | Hole ................. H04W 72/0406 |
| | | 370/329 |
| 2012/0023235 A1 | 1/2012 | Hole et al. |
| 2013/0260810 A1* | 10/2013 | Rayavarapu ........ H04W 76/028 |
| | | 455/509 |
| 2014/0334318 A1 | 11/2014 | Pica et al. |
| 2016/0205661 A1* | 7/2016 | Ryu ...................... H04W 36/30 |
| | | 455/458 |

OTHER PUBLICATIONS

Nokia, Discussion paper "Fixed Allocation", GP-020645, 3GPP TSG-GERAN#9, Seattle, USA, Apr. 15-19, 2002, the whole document.

Ericsson: "EC-GSM—PDTCH Resource Transmission Management", 3GPP TSG GERAN Ad Hoc#1 FS_IoT_LC, Tdoc GPC150078, Agenda item 2.4.4, Sofia Antipolis, France, Feb. 2-5, 2015, section 3 'Flexible Downlink Allocation', Figure 3-1—Downlink Small Data Transmission.

3GPP TR 45.820 V1.2.1 (May 2015), 3rd Generation Partnership Project; Technical Specification Group GSM/EDGE Radio Access Network; Cellular System Support for Ultra Low Complexity and Low Throughput Internet of Things; (Release 13), May 12, 2015 (May 12, 2015), section "6.2.5.12 Flexible Downlink Allocation".

Ericsson LM: "Pseudo CR 45.820—EC-GSM—Concept description", 3GPP TSG GERAN Ad Hoc #1 on Cellular IoT, GPC150113, Agenda item 1.4.3.1, 2.7, Sofia Antipolis, Feb. 2-5, 2015, section "6.2.5.7 Flexible Downlink Allocation".

\* cited by examiner

GSM EVOLUTION PACKET DATA TRAFFIC CHANNEL RESOURCE TRANSMISSION MANAGEMENT—FLEXIBLE DOWNLINK ALLOCATION TECHNIQUE

CLAIM OF PRIORITY

This application claims the benefit of priority to U.S. Provisional Application Ser. No. 62/108,489, filed on Jan. 27, 2015, the entire contents of which are hereby incorporated by reference for all purposes.

RELATED PATENT APPLICATION

This application is related to the following co-filed application: U.S. application Ser. No. 15/006,703 entitled "GSM EVOLUTION PACKET DATA TRAFFIC CHANNEL RESOURCE TRANSMISSION MANAGEMENT—FIXED UPLINK ALLOCATION TECHNIQUE" (Docket No. P46023-US2), the entire contents of which are hereby incorporated herein by reference for all purposes.

TECHNICAL FIELD

The present disclosure relates generally to the wireless communications field and, more particularly, to a radio access network node (e.g., Base Station Subsystem), a wireless device (e.g., a mobile station), and various methods for improving the allocation of radio resources for wireless communications. In one embodiment, the radio access network node and wireless device implement a fixed uplink allocation technique. In another embodiment, the radio access network node and wireless device implement a flexible downlink allocation technique.

BACKGROUND

The following abbreviations and terms are herewith defined, at least some of which are referred to within the following description of the present disclosure.
3GPP 3rd-Generation Partnership Project
ACK Acknowledge
AGCH Access Grant Channel
ASIC Application Specific Integrated Circuit
BLER Block Error Rate
BSS Base Station Subsystem
CC Coverage Class
EC Extended Coverage
eDRX Extended Discontinuous Receive Cycle
EC-AGCH Extended Coverage Access Grant Channel
EC-PCH Extended Coverage Paging Channel
DSP Digital Signal Processor
EDGE Enhanced Data rates for GSM Evolution
EGPRS Enhanced General Packet Radio Service
FAI Final Acknowledge Indicator
FDA Flexible Downlink Allocation
FN Frame Number
FUA Fixed Uplink Allocation
GSM Global System for Mobile Communications
GERAN GSM/EDGE Radio Access Network
GPRS General Packet Radio Service
HARQ Hybrid Automatic Repeat Request
IMSI International Mobile Subscriber Identity
IoT Internet of Things
LLC Logical Link Control
LTE Long-Term Evolution
MCS Modulation and Coding Scheme
MS Mobile Station
MTC Machine Type Communications
PCH Paging Channel
PDN Packet Data Network
PDTCH Packet Data Traffic Channel
PDU Protocol Data Unit
RACH Random Access Channel
RAN Radio Access Network
RAI Routing Area Identity
RAU Routing Area Update
RLC Radio Link Control
RRBP Relative Reserved Block Period
SGSN Serving GPRS Support Node
TDMA Time Division Multiple Access
TFI Temporary Flow Identity
TS Time Slot
TSC Training Sequence Code
TSG Technical Specifications Group
UE User Equipment
USF Uplink State Flag
WCDMA Wideband Code Division Multiple Access
WiMAX Worldwide Interoperability for Microwave Access
Coverage Class: At any point in time a device belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of degraded radio interface performance attributes compared to the reference coverage (e.g., up to 20 dB less than the reference coverage). Coverage class determines the total number of blind transmissions to be used when transmitting/receiving radio blocks. An uplink/downlink coverage class applicable at any point in time can differ between different logical channels. Upon initiating a system access a device determines the uplink/downlink coverage class applicable to the RACH/AGCH based on estimating the number of blind transmissions of a radio block needed by the BSS receiver/device receiver to experience a BLER (block error rate) of approximately 10%. The BSS determines the uplink/downlink coverage class to be used by a device on the device's assigned packet channel resources based on estimating the number of blind transmissions of a radio block needed to satisfy a target BLER and considering the number of HARQ retransmissions (of a radio block) that will, on average, be required for successful reception of a radio block using that target BLER. Note: a device operating with radio interface performance attributes corresponding to the reference coverage is considered to be in the best coverage class (i.e., coverage class 1) and therefore does not make blind transmissions.
eDRX cycle: eDiscontinuous reception (eDRX) is a process of a wireless device disabling its ability to receive when it does not expect to receive incoming messages and enabling its ability to receive during a period of reachability when it anticipates the possibility of message reception. For eDRX to operate, the network coordinates with the wireless device regarding when instances of reachability are to occur. The wireless device will therefore wake-up and enable message reception only during pre-scheduled periods of reachability. This process reduces the power consumption which extends the battery life of the wireless device and is sometimes called (deep) sleep mode.
Nominal Paging Group: The specific set of EC-PCH blocks a device monitors once per eDRX cycle. The device determines this specific set of EC-PCH blocks using an algorithm that takes into account its IMSI, its eDRX cycle length and its downlink coverage class.

As discussed in the 3GPP TSG-GERAN Meeting #63 Tdoc GP-140624, entitled "Cellular IoT-PDCH UL Resource Management," dated Aug. 25-29, 2014 (the contents of which are hereby incorporated herein for all purposes), the GSM Evolution (now referred to as EC-GSM) will use the concept of pre-allocating radio blocks on uplink (UL) EC-Packet Data Traffic Channel (PDTCH) resources in the interest of avoiding Uplink Status Flag (USF) based uplink transmissions for wireless devices operating in extended coverage, and to optimize the energy consumption in the wireless device when in packet transfer mode. The present disclosure describes various ways for improving the allocation of radio resources in wireless communications to address a need associated with the concept of pre-allocating radio blocks or radio resources on the UL EC-PDTCH. In addition, the present disclosure describes various ways for improving the allocation of radio resources in wireless communication to address a need associated with the concept of pre-allocating radio blocks or radio resources on the DL EC-PDTCH.

SUMMARY

A radio access network node (e.g., BSS), a wireless device and various methods for addressing at least the aforementioned needs are described in the independent claims. Advantageous embodiments of the radio access network node (e.g., BSS), the wireless device and the various methods are further described in the dependent claims.

In one aspect, the present disclosure provides a radio access network (RAN) node configured to interact with a core network (CN) node and a wireless device. The RAN node comprises a processor and a memory that stores processor-executable instructions, wherein the processor interfaces with the memory to execute the processor-executable instructions, whereby the RAN node is operable to perform a first receive operation, a first transmit operation, a second receive operation, a second transmit operation, and a third receive operation. In the first receive operation, the RAN node receives a paging request message from the CN node. The paging request message is associated with the wireless device. In the first transmit operation, the RAN transmits one or more repetitions of a page message to the wireless device. In the second receive operation, the RAN node receives one or more repetitions of an access request message from the wireless device, the access request message requesting resources for transmitting a page response message. In the second transmit operation, the RAN node transmits one or more repetitions of an uplink assignment message to the wireless device. The uplink assignment message comprises: (a) an indication of a number of pre-allocated radio block(s) on a packet data traffic channel; and (b) an indication of an Uplink (UL) coverage class. In the third receive operation, the RAN node receives one or more repetitions of a page response message from the wireless device. The page response message comprises: uplink payload, wherein the uplink payload is received in the pre-allocated radio block(s), and wherein the page response message is repeated according to the UL coverage class. An advantage of the RAN node implementing these operations is that it can support page response transmissions for a wireless device operating in an extended coverage condition for which the legacy USF based mechanism commonly used for supporting page response transmissions is not feasible.

In one aspect, the present disclosure provides a method in a radio access network (RAN) node configured to interact with a core network (CN) node and a wireless device. The method comprising a first receiving step, a first transmitting step, a second receiving step, a second transmitting step, and a third receiving step. In the first receiving step, the RAN node receives a paging request message from the CN node. The paging request message is associated with the wireless device. In the first transmitting step, the RAN transmits one or more repetitions of a page message to the wireless device. In the second receiving step, the RAN node receives one or more repetitions of an access request message from the wireless device, the access request message requesting resources for transmitting a page response message. In the second transmitting step, the RAN node transmits one or more repetitions of an uplink assignment message to the wireless device. The uplink assignment message comprises: (a) an indication of a number of pre-allocated radio block(s) on a packet data traffic channel; and (b) an indication of an Uplink (UL) coverage class. In the third receiving step, the RAN node receives one or more repetitions of a page response message from the wireless device. The page response message comprises: uplink payload, wherein the uplink payload is received in the pre-allocated radio block(s), and wherein the page response message is repeated according to the UL coverage class. An advantage of the RAN node implementing these steps is that it can support page response transmissions for a wireless device operating in an extended coverage condition for which the legacy USF based mechanism commonly used for supporting page response transmissions is not feasible.

In yet another aspect, the present disclosure provides a wireless device configured to interact with a radio access network (RAN) node. The wireless device comprises a processor and a memory that stores processor-executable instructions, wherein the processor interfaces with the memory to execute the processor-executable instructions, whereby the wireless device is operable to perform a first receive operation, a first transmit operation, a second receive operation, a second transmit operation. In the first receive operation, the wireless device receives one or more repetitions of a page message from the RAN node. In the first transmit operation, the wireless device transmits one or more repetitions of an access request message to the RAN node, the access request message requesting resources for transmitting a page response message. In the second receive operation, the wireless device receives one or more repetitions of an uplink assignment message from the RAN node. The uplink assignment message comprises at least: (a) an indication of a number of pre-allocated radio block(s); and (b) an indication of an Uplink (UL) coverage class. In the second transmit operation, the wireless device transmit one or more repetitions of a page response message to the RAN node. The page response message comprises: uplink payload, wherein the uplink payload is transmitted in the pre-allocated radio block(s), and wherein the page response message is repeated according to the UL coverage class. An advantage of the wireless device implementing these operations is that it can send a page response while operating in an extended coverage condition for which the legacy USF based mechanism commonly used for supporting page response transmissions is not feasible.

In yet another aspect, the present disclosure provides a method in a wireless device configured to interact with a radio access network (RAN) node. The method comprises a first receiving step, a first transmitting step, a second receiving step, a second transmitting step. In the first receiving step, the wireless device receives one or more repetitions of a page message from the RAN node. In the first transmitting step, the wireless device transmits one or more repetitions of an access request message to the RAN node. The access request message requesting resources for transmitting a page response message. In the second receiving step, the wireless device receives one or more repetitions of an uplink assignment message from the RAN node. The uplink assignment message comprises at least: (a) an indication of a number of pre-allocated radio block(s); and (b) an indication of an Uplink (UL) coverage class. In the second transmitting step, the wireless device transmit one or more repetitions of a page response message to the RAN node. The page response message comprises: uplink payload, wherein the uplink payload is transmitted in the pre-allocated radio block(s), and wherein the page response message is repeated according to the UL coverage class. An advantage of the wireless device implementing these steps is that it can send a page response while operating in an extended coverage condition for which the legacy USF based mechanism commonly used for supporting page response transmissions is not feasible.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
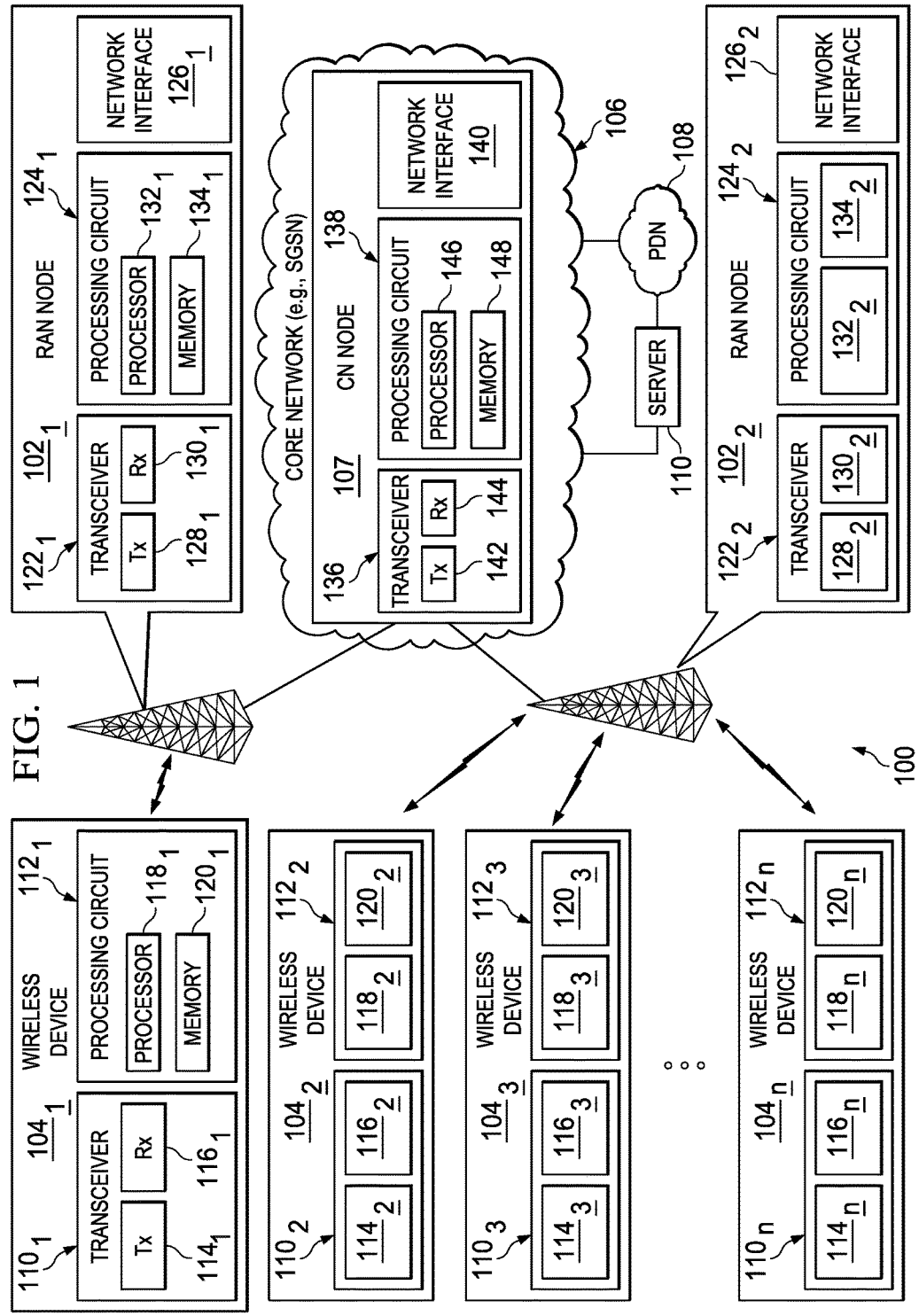
FIG. 1 is a diagram of an exemplary wireless communication network which comprises a CN node, multiple RAN nodes, and multiple wireless devices which are configured in accordance with an embodiment of the present disclosure.

A discussion is provided first herein to describe an exemplary wireless communication network that includes a CN node (e.g., SGSN), multiple RAN nodes (e.g., BSSs), and multiple wireless devices which are configured in accordance with the present disclosure (illustrated in FIG. 1). Then, a discussion is provided to disclose how a RAN node and a wireless device can implement a fixed uplink allocation technique in accordance with an embodiment of the present disclosure (illustrated in FIGS. 2-6). Thereafter, a discussion is provided to disclose how a RAN node and a wireless device can implement a flexible downlink allocation technique in accordance with an embodiment of the present disclosure (illustrated in FIGS. 7-16).

Exemplary Wireless Communication Network 100

Referring to FIG. 1, there is illustrated an exemplary wireless communication network 100 in accordance with the present disclosure. The wireless communication network 100 includes a core network 106 (which comprises a CN node 107) and multiple RAN nodes $102_1$ and $102_2$ (only two shown) which interface with multiple wireless devices $104_1$, $104_2$, $104_3$ ... $104_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the RAN nodes $102_1$ and $102_2$ (only two shown) which provide network access to the wireless devices $104_1$, $104_2$, $104_3$ ... $104_n$. In this example, the RAN node $102_1$ is providing network access to wireless device $104_1$ while the RAN node $102_2$ is providing network access to wireless devices $104_2$, $104_3$ ... $104_n$. The RAN nodes $102_1$ and $102_2$ are connected to the core network 106 (e.g., SGSN core network 106) and, in particular, to the CN node 107 (e.g., SGSN 107). The core network 106 is connected to an external packet data network (PDN) 108, such as the Internet, and a server 110 (only one shown). The wireless devices $104_1$, $104_2$, $104_3$ ... $104_n$ may communicate with one or more servers 110 (only one shown) connected to the core network 106 and/or the PDN 108.

The wireless devices $104_1$, $104_2$, $104_3$ ... $104_n$ may refer generally to an end terminal (user) that attaches to the wireless communication network 100, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1$, $104_2$, $104_3$ ... $104_n$ may include a transceiver circuit $110_1$, $110_2$, $110_3$ ... $110_n$ for communicating with the RAN nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding wireless device $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard. The processing circuit $112_1$, $112_2$, $112_3$ ... $112_n$ may include a processor $118_1$, $118_2$, $118_3$ ... $118_n$ and a memory $120_1$, $2102$, $120_3$ ... $120_n$ for storing program code for controlling the operation of the corresponding wireless device $104_1$, $104_2$, $104_3$ ... $104_n$. The program code may include code for performing the procedures as described hereinafter with respect to FIGS. 5, 10, and 15.

Each RAN node $102_1$ and $102_2$ may include a transceiver circuit $122_1$ and $122_2$ for communicating with wireless devices $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$, and a memory $134_1$ and $134_2$ for storing program code for controlling the operation of the corresponding RAN node $102_1$ and $102_2$. The program code may include code for performing the procedures as described hereinafter with respect to FIGS. 3, 8, and 13.

The CN node 107 (e.g., SGSN 107, Mobility Management Entity (MME) 107) may include a transceiver circuit 136 for communicating with the RAN nodes $102_1$ and $102_2$, a processing circuit 138 for processing signals transmitted from and received by the transceiver circuit 136 and for controlling the operation of the CN node 107, and a network interface 140 for communicating with the RAN nodes $102_1$ and $102_2$. The transceiver circuit 136 may include a transmitter 142 and a receiver 144, which may operate according to any standard, e.g., the GSM/EDGE standard. The processing circuit 138 may include a processor 146 and a memory 148 for storing program code for controlling the operation of the CN node 107. The program code may include code for performing the procedures as described hereinafter.

Fixed Uplink Allocation Technique

The Fixed Uplink Allocation (FUA) technique is used on the uplink of an EC-PDTCH by providing a wireless device $104_2$ (for example) with a fixed starting point to transmit each one of a set of RLC data radio blocks $202_1$, $202_2$ ... $202_n$ from its buffered user plane payload to the RAN node $102_2$ (for example), as briefly described below and then described in more detail with respect to FIGS. 2-6.

A feature of the FUA technique is that wireless device $104_2$ is pre-allocated, in an uplink assignment message 206 (e.g., EC-AGCH Resource Assignment message 206), a set of radio blocks over up to 4 timeslots where the wireless device $104_2$ subsequently transmits one or more RLC data blocks $202_1$, $202_2$ ... $202_X$ to the RAN node $102_2$, where each RLC data block $202_1$, $202_2$ ... $202_X$ is repeated according to a value for $N_{TX, UL}$ indicated by the uplink assignment message 206.

The set of radio blocks are allocated so that all repetitions of each specific RLC data block $202_1$, $202_2$ ... $202_X$ are transmitted contiguously but without needing that each of the RLC data blocks $202_1$, $202_2$ ... $202_X$ be transmitted contiguous to each other.

After the transmission of its RLC data blocks $202_1$, $202_2$ ... $202_X$ on the pre-allocated radio blocks, the wireless device $104_2$ waits for a corresponding Packet Uplink Ack/Nack (PUAN) message 208, which occurs within a variable amount of time after the wireless device $104_2$ transmits the last allocated radio block. The PUAN message 208 provides an Ack/Nack bitmap and another set of pre-allocated uplink radio blocks (if necessary—i.e., when all of the RLC data blocks $202_1$, $202_2$ ... $202_X$ have not been successfully received by the RAN node $102_2$) so that the wireless device $104_2$ may continue its uplink transmission.

Figure 2:
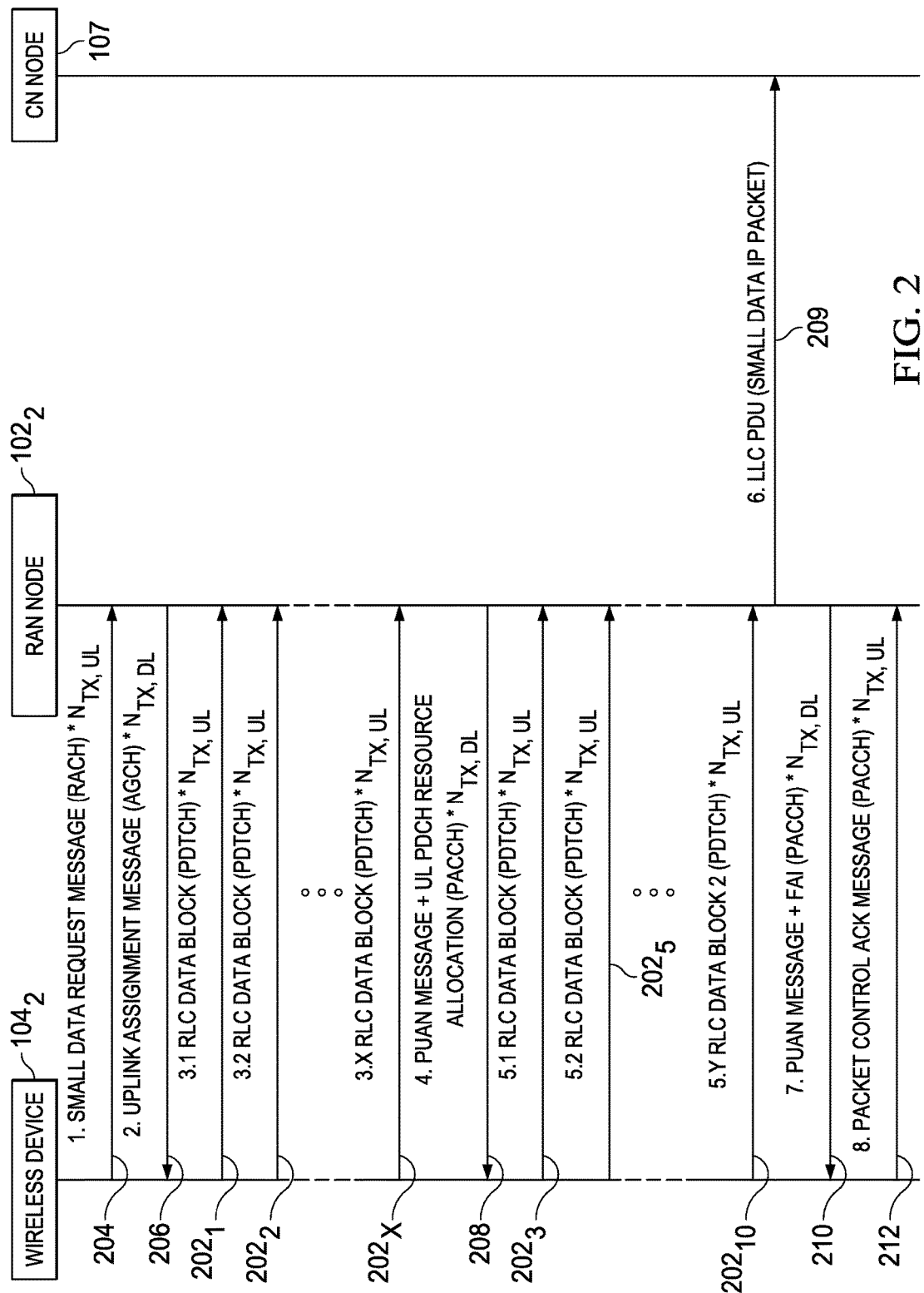
FIG. 2 is a signal flow diagram illustrating the signaling associated with a wireless device making an uplink small data transmission to a RAN node utilizing a fixed uplink allocation technique in accordance with an embodiment of the present disclosure.

An exemplary sequence of signaling steps associated with the FUA technique is illustrated in FIG. 2 and described in detail below with respect to the wireless device $104_2$ (e.g., IoT device $104_2$) having an uplink coverage class needing $N_{TX, UL}$ repetitions, a downlink coverage class needing $N_{TX, DL}$ repetitions, and needing X MCS-1 coded RLC data blocks $202_1$, $202_2$ ... $202_X$ to send its user plane payload. The exemplary signaling steps associated with the wireless device $104_2$ initiating an uplink small data transmission to transmit its user plane payload to the RAN node $102_2$ are as follows:

Step 1:

The wireless device $104_2$ transmits multiple repetitions of a Small Data Request message 204 (e.g., access request message 204) on the EC-Random Access Channel (RACH) to the RAN node $102_2$ (e.g., BSS $102_2$). The number of repetitions is determined based on the wireless device's estimated uplink (UL) coverage class (note: a wireless device in normal coverage would use a single transmission (i.e., not repeated) when transmitting a Small Data Request message 204 on the RACH/EC-RACH). The Small Data Request message 204 can be configured as follows:

The wireless device $104_2$ includes information within the Small Data Request message 204 as indicated by TABLE #1, where the Number of MCS-1 Coded Blocks field is used to indicate the wireless device $104_2$ has X MCS-1 RLC data blocks $202_1, 202_2 \ldots 202_X$ to transmit to the RAN node $102_2$.

An indication of whether or not the wireless device $104_2$ supports MCS-5 through MCS-9 is indicted by the TSC used when transmitting the Small Data Request message 204 as per legacy operation.

The Small Data Request message 204 transmitted on the EC-RACH includes an indication of the DL coverage class estimated by the wireless device $104_2$.

System Information (SI) transmitted on timeslot (TS) 1 indicates that if a wireless device $104_3$ (for example) is in normal coverage ($N_{TX, UL}=N_{TX, DL}=1$) then it is to perform a system access using the RACH of TS0 or the RACH of TS1. Note: the System Information (SI) would be transmitted by the RAN node $102_2$ before the wireless device $104_3$ uses the RACH to transmit the Small Data Request message 204.

TABLE #1

Content of Small Data Request Message 204

| Type of Access Request | Number of MCS-1 Coded Blocks (4 bits) | Priority Indicator (1 bit) | Random Bits (3 bits) | DL Coverage Class (3 bits) | Device Identity (32 bits) |
|---|---|---|---|---|---|
| AB on TS0 | Yes | Yes | Yes | No[1] | No |
| AB on TS1 | Yes | Yes | Yes | Yes | No |
| NB on TS0 | Yes | Yes | No | No[1] | Yes |
| NB on TS1 | Yes | Yes | No | Yes | Yes |

NOTE[1]
Not needed since the access is always when in normal coverage on UL and DL Step 2:

The Uplink Assignment message 206 is transmitted by the RAN node $102_2$ to the wireless device $104_2$ on the EC-AGCH using a number of repetitions as indicated by the DL coverage class value included in the Small Data Request message 204:

The Uplink Assignment message 206 indicates the number of pre-allocated MCS-1 coded UL radio blocks X, the starting point of the pre-allocated radio blocks needed for sending the first RLC data block $202_1$ (for example) on the assigned EC-PDTCH resources (e.g., expressed as an offset relative to where the Uplink Assignment message 206 is received), as well as the starting points of the pre-allocated radio blocks needed for sending the additional RLC data blocks $202_2$, $202_3 \ldots 202_X$, where each RLC data block $202_1, 202_2, 202_3 \ldots 202_X$ is sent using $N_{TX, UL}$ repetitions.

The Uplink Assignment message 206 also indicates the DL coverage class $N_{TX, DL}$ and the UL coverage class $N_{TX, UL}$ to be used by the wireless device $104_2$ on the assigned EC-PDTCH resources. This DL coverage class may override the DL coverage class indicated by the wireless device $104_2$ in the Small Data Request message 204.

For example, if the uplink payload needing transmission consists of 5 MCS-1 RLC data blocks $202_1, 202_2, 202_3, 202_4$ and $202_5$ (X=5) and $N_{TX, UL}$ indicates 8 repetitions are needed, then a total of 40 radio blocks ($X*N_{TX, UL}$) needs to be transmitted. Each RLC data block $202_1$, $202_2, 202_3, 202_4$ and $202_5$ will then be transmitted using 8 pre-allocated contiguous radio blocks.

The Uplink Assignment message 206 may indicate a coding scheme other than MCS-1 (e.g., depending on the capability of the wireless device $104_3$ (for example) when sent in response to a Small Data Request message 204 from a wireless device $104_3$ (for example) in normal coverage.

The set of $N_{TX, UL}$ pre-allocated radio blocks used for transmitting any given RLC data block $202_1, 202_2 \ldots 202_X$ can be transmitted using compact burst mapping.

Step 3:

A HARQ scheme can be used for transmitting the uplink payload wherein, after transmitting the set of X RLC data blocks $202_1, 202_2 \ldots 202_X$, the wireless device $104_2$ waits for a corresponding PUAN message 208.

Step 4:

The RAN node $102_2$ (e.g., BSS $102_2$) transmits the PUAN message 208 after attempting to receive the set of X RLC data blocks $202_1, 202_2 \ldots 202_X$ from the wireless device $104_2$.

The wireless device $104_2$ may start looking for an expected PUAN message 208 in the first DL EC-Packet Associated Control Channel (PACCH) block (corresponding to the wireless device $104_2$'s DL coverage class) following the last pre-allocated radio block that the wireless device $104_2$ used to transmit the $N_{TX, UL}$ repetitions of the last UL RLC data block $202_X$ (i.e., RLC data block X).

The wireless device $104_2$ examines fixed sets of EC-PACCH blocks based on the wireless device $104_2$'s assigned DL coverage class (i.e., $N_{TX, DL}$). For example, if the wireless device $104_2$ uses $N_{TX, DL}=2$ (i.e., 2 blind repetitions) it will only look at fixed pairs of EC-PACCH blocks in an attempt to receive a matching PUAN message 208. As such, the wireless device $104_2$ will view each 52-multiframe on a monitored TS as potentially containing 6 pairs of EC-PACCH blocks, where any one of these pairs may potentially contain the wireless device $104_2$'s expected PUAN message 208.

If the expected PUAN message 208 is not received within the first possible set of EC-PACCH blocks, then the wireless device $104_2$ may attempt to receive the PUAN message 208 within the next possible set of EC-PACCH blocks but within the context of a certain maximum time window.

When the expected PUAN message 208 is received and indicates Y RLC data blocks $202_3, 202_5$ and $202_{10}$ (for example) are missing, they are re-transmitted to the RAN node $102_2$ by the wireless device $104_2$ using the new set of pre-allocated uplink radio blocks indicated by the PUAN message 208 (see step 5).

The PUAN message 208 may also indicate a new value for $N_{TX, UL}$ that the wireless device $104_2$ is to apply when resending the Y remaining RLC data blocks $202_3$, $202_5$ and $202_{10}$ (for example) (see step 5).

If the expected PUAN message 208 is not received within a maximum allowed time window, the wireless device $104_2$ will abort the uplink transmission. The RAN node $102_2$ (e.g., BSS $102_2$), upon transmitting the PUAN message 208 and not detecting any uplink radio blocks $202_3, 202_5$ and $202_{10}$ (for example) on the pre-allocated resources, may resend the PUAN message 208 using EC-PACCH blocks according to $N_{TX, DL}$ (e.g., upon deciding to resend the PUAN message 208, the RAN node $102_2$ will apply the same $N_{TX, DL}$ used previously for that wireless device $104_2$).

The RAN node $102_2$ (e.g., BSS $102_2$) may abort the uplink transmission after failing to receive the missing RLC data blocks $202_3$, $202_5$ and $202_{10}$ (for example) after resending the PUAN message 208 an implementation-specific number of times.

Step 5:

Step 3 is repeated but the wireless device $104_2$ transmits the Y RLC data blocks $202_3$, $202_5$ and $202_{10}$ (for example) instead of transmitting the X RLC data blocks $202_1$, $202_2$ ... $202_X$.

Step 6:

After all the RLC data blocks X RLC data blocks $202_1$, $202_2$ ... $202_X$ have been received, the RAN node $102_2$ (e.g., BSS $102_2$) re-assembles a Logical Link Control (LLC) PDU 209 (comprising an Internet Protocol (IP) Packet using the X RLC data blocks $202_1$, $202_2$ ... $202_X$) and transmits the LLC PDU 209 to the CN node 107 (e.g., SGSN 107).

Step 7:

The RAN node $102_2$ (e.g., BSS $102_2$) transmits a PUAN message 210 to the wireless device $104_2$ indicating that all X RLC data blocks $202_1$, $202_2$ ... $202_X$ have been received and including a Final Ack Indicator (FAI) set to indicate completion of the uplink transmission. The wireless device $104_2$ receives the PUAN message 210 on the EC-PACCH, as described in Step 4, and realizes that all X RLC data blocks $202_1$, $202_2$ ... $202_X$ have been received by the RAN node $102_2$ (e.g., BSS $102_2$). The RAN node $102_2$/wireless device $104_2$ then releases the assigned UL EC-PDTCH resources after sending/receiving the PUAN message 210 except for the case where the priority field of the Small Data Request message 204, in Step 1, indicated a high priority (e.g., an alarm), in which case Step 8 below may be applicable.

Step 8:

The Packet Control Ack message 212 is optional but would typically be used for the case where the UL payload (X RLC data blocks $202_1$, $202_2$ ... $202_X$) was transmitted for an alarm reporting event (e.g., since alarm reporting needs more reliability). The wireless device $104_2$ transmits the Packet Control Ack message 212 using a single uplink EC-PACCH block repeated according to the $NU_{TX, UL}$ value last provided by the RAN node $102_2$ (e.g., BSS $102_2$) to the wireless device $104_2$.

The RRBP field in the header of the EC-PACCH block used to send the PUAN message 210 indicates the starting point of the pre-allocated UL radio blocks to be used to transmit the Packet Control Ack message 212 (e.g., $N_{TX, UL}$ radio blocks are pre-allocated).

If the RAN node $102_2$ (e.g., BSS $102_2$) fails to receive an expected Packet Control Ack message 212, then the RAN node $102_2$ (e.g., BSS $102_2$) may re-transmit the PUAN message 210 an implementation-specific number of times and then abort the uplink transmission, as in Step 4.

The wireless device $104_2$ that receives a PUAN message 210 soliciting the transmission of a Packet Control Ack message 212 shall, after transmitting the Packet Control Ack message 212, continue to monitor the DL for possible EC-PACCH messages for a limited time interval Z (e.g., indicated by the PUAN message 210) for the possible arrival of a repeated PUAN message 210 soliciting the re-transmission of the Packet Control Ack message 212.

If no additional PUAN message 210 is received during the time interval Z, then the wireless device $104_2$ releases the assigned UL EC-PDTCH resources.

Note: Due to the half-duplex nature of the FUA technique, no simultaneous downlink reception will occur during the time of an uplink transmission.

Figure 3:
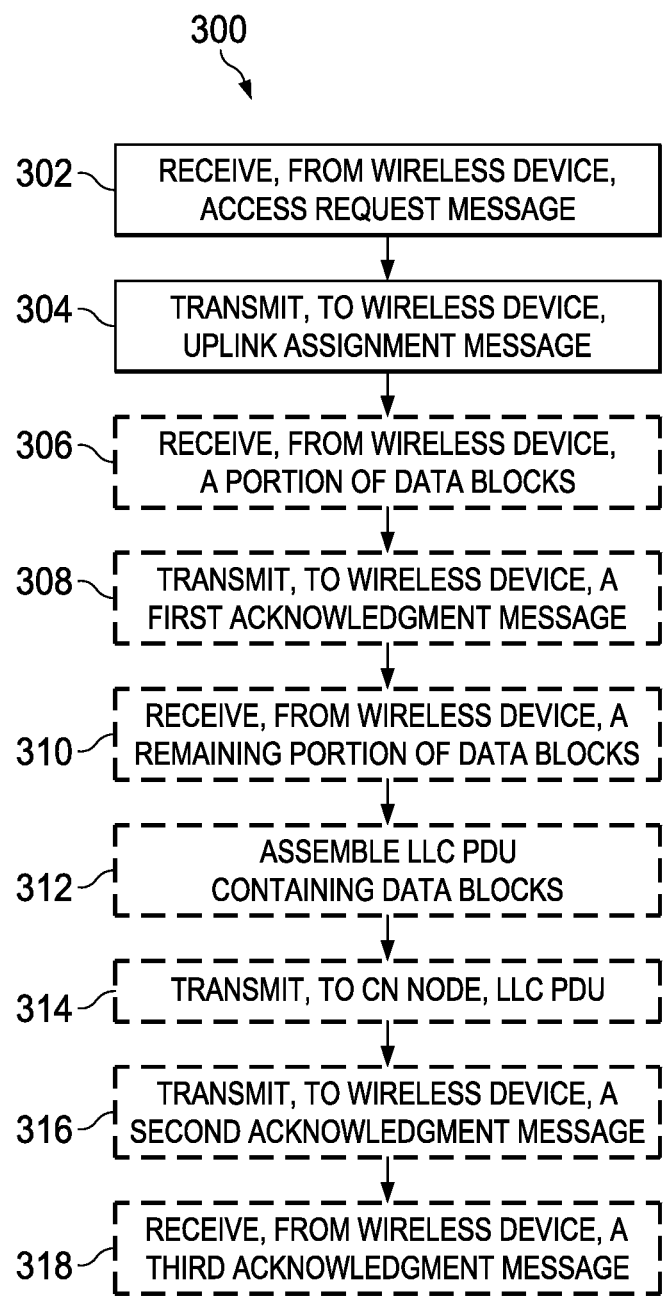
FIG. 3 is a flowchart of a method implemented in the RAN node shown in FIG. 2 in accordance with an embodiment of the present disclosure.

Referring to FIG. 3, there is a flowchart of a method 300 implemented in the RAN node $102_2$ (e.g., BSS $102_2$) shown in FIG. 2 in accordance with an embodiment of the present disclosure. At step 302, the RAN node $102_2$ receives one or more repetitions of an access request message 204 (e.g., Small Data Request message 204) from the wireless device $104_2$ (for example) (see FIG. 2's step 1 for additional details). The access request message 204 can comprise: (a) an indication of a number of data blocks $202_1$, $202_2$ ... $202_X$ the wireless device $104_2$ intends to transmit to the RAN node $102_2$; and (b) an indication ($N_{TX, DL}$) of a DL coverage class estimated by the wireless device $104_2$. The number of repetitions of the access request message 204 is based on the UL coverage class.

At step 304, the RAN node $102_2$ transmits one or more repetitions of an uplink assignment message 206 to the wireless device $104_2$ (see FIG. 2's step 2 for additional details). The uplink assignment message 206 can comprise: (a) an indication of a number of pre-allocated radio blocks on a packet data traffic channel; (b) an indication ($N_{TX, UL}$) of an UL coverage class; and (c) an indication of a starting point of the pre-allocated radio blocks that the wireless device $104_2$ is to use to transmit a first data block $202_1$ (for example) from the data blocks $202_1$, $202_2$ ... $202_X$ that the wireless device $104_2$ intends to transmit to the RAN node $102_2$; (d): an indication ($N_{TX, DL}$) of a DL coverage class; and (e) an indication of starting points of the pre-allocated radio blocks that the wireless device $104_2$ is to use to transmit data blocks $202_2$ ... $202_X$ (for example) subsequent to the first data block $202_1$ (for example) that the wireless device $104_2$ intends to transmit to the RAN node $102_2$. The number of repetitions of the uplink assignment message 206 is based on the DL coverage class $N_{TX, DL}$. As discussed above, the pre-allocated radio blocks are allocated by the RAN node $102_2$ such that (1) all repetitions of each of the data blocks $202_1$, $202_2$ ... $202_X$ are to be transmitted contiguously by the wireless device $104_2$, and (2) the pre-allocated radio blocks are allocated such that each of the data blocks $202_1$, $202_2$ ... $202_X$ does not need to be transmitted contiguously with respect to one another by the wireless device $104_2$.

At step 306, the RAN node $102_2$ receives from the wireless device $104_2$ a portion of the number of data blocks $202_1$, $202_2$ ... $202_X$ which were indicated in the access request message 204 (see FIG. 2's step 3 for additional details—note: the wireless device $104_2$ transmits all of the data blocks $202_1$, $202_2$ ... $202_X$ and ideally the RAN node $102_2$ would receive all of the data blocks $202_1$, $202_2$ ... $202_X$ but in this example the RAN node $102_2$ does not receive data blocks $202_3$, $202_5$ and $202_{10}$). The RAN node $102_2$ would receive the portion of the number of data blocks $202_1$, $202_2$ ... $202_X$ in the portion of the pre-allocated radio blocks. Plus, each of the received data blocks $202_1$, $202_2$, $202_4$, $202_6$, $202_7$, $202_8$, $202_9$, $202_{11}$ ... $202_X$ (for example) would have been repeated a number of times ($N_{TX, UL}$) by the wireless device $104_2$ according to the UL coverage class.

At step 308, the RAN node $102_2$ transmits one or more repetitions of a first acknowledgment message 208 (e.g., PUAN message 208) to the wireless device $104_2$ (see FIG. 2's step 4 for additional details). The first acknowledgment message 208 comprises: (a) a first bitmap indicating the portion of the number of data blocks $202_1$, $202_2$ ... $202_x$ that have been received and a remaining portion of the number of data blocks $202_1$, $202_2$ ... $202_x$ that have not been received (note: in this example the RAN node $102_2$ did not receive data blocks $202_3$, $202_5$ and $202_{10}$); (b) an indication of another number of pre-allocated radio blocks on the packet data traffic channel that the wireless device $104_2$ is to use to transmit the remaining portion of the number of data blocks $202_1$, $202_2$ ... $202_x$ which in this example are data blocks $202_3$, $202_5$ and $202_{10}$; and (c) an indication ($N_{TX, DL}$) of a DL coverage class. The number of repetitions of the first acknowledgment message 208 is based on the DL coverage class.

At step 310, the RAN node $102_2$ receives from the wireless device $104_2$ the remaining portion of the number of data blocks $202_1$, $202_2$ ... $202_x$ which in this example are data blocks $202_3$, $202_5$ and $202_{10}$ (see FIG. 2's step 5 for additional details). The RAN node $102_2$ would receive the remaining portion of the number of data blocks $202_1$, $202_2$ ... $202_x$ in the pre-allocated radio blocks indicated by the first acknowledgement message 208. Plus, each of the received data blocks $202_3$, $202_5$ and $202_{10}$ would have been repeated a number of times ($N_{TX, UL}$) by the wireless device $104_2$ according to the UL coverage class.

At steps 312 and 314, the RAN node $102_2$ assembles (step 312) a LLC PDU 209 including the received portion and the received remaining portion of the number of data blocks $202_1$, $202_2$ ... $202_x$ (i.e., all of the data blocks $202_1$, $202_2$ ... $202_x$) and transmits (step 314) the LLC PDU 209 to the CN node 107 (e.g., SGSN 107) (see FIG. 2's step 6 for additional details).

At step 316, the RAN node $102_2$ transmits one or more repetitions of a second acknowledgment message 210 (e.g., PUAN message 210) to the wireless device $104_2$ (see FIG. 2's step 7 for additional details). The second acknowledgment message 210 comprises a second bitmap indicating that all of data blocks $202_1$, $202_2$ ... $202_x$ have been received by the RAN node $102_2$ and a Final Ack Indicator (FAI) indicating completion of the uplink transmission. The number of repetitions of the second acknowledgment message 210 is based on the DL coverage class.

At step 318, the RAN node $102_2$ receives one or more repetitions of a third acknowledgment message 212 (e.g., Packet Control Ack message 212) from the wireless device $104_2$ (see FIG. 2's step 8 for additional details). The third acknowledgment message 212 comprises an indication that the second acknowledgment message 210 (e.g., PUAN message 210) has been received by the wireless device $104_2$. The third acknowledgment message 212 would have been repeated a number of times ($N_{TX, UL}$) by the wireless device $104_2$ according to the UL coverage class. The other RAN node $102_1$ can also be configured in a similar manner to perform method 300.

Figure 4:
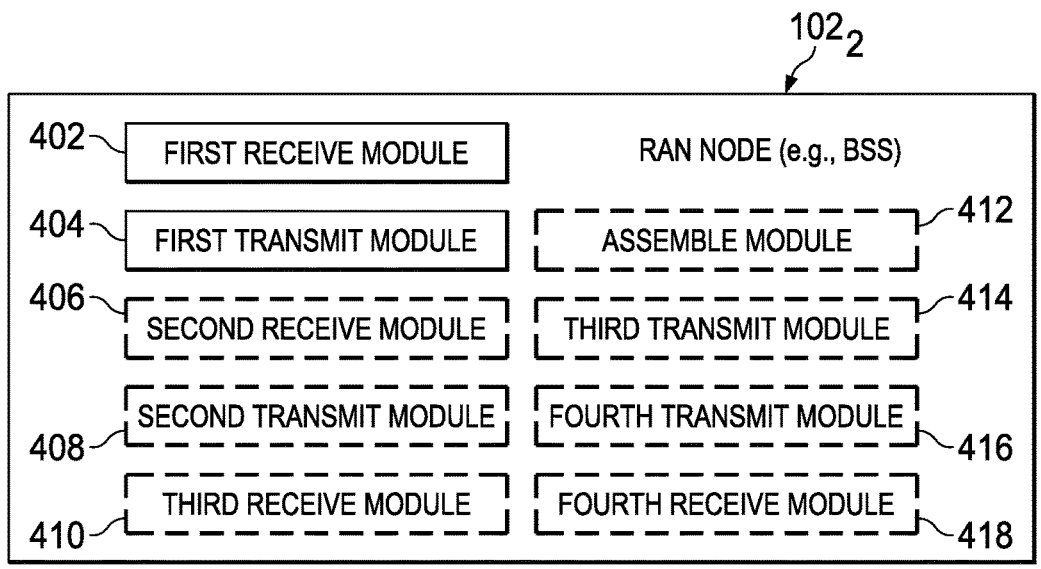
FIG. 4 is a block diagram illustrating an exemplary structure of the RAN node shown in FIG. 2 configured in accordance with an embodiment of the present disclosure.

Referring to FIG. 4, there is a block diagram illustrating structures of an exemplary RAN node $102_2$ (for example) configured in accordance with an embodiment of the present disclosure. In one embodiment, the RAN node $102_2$ may comprise a first receive module 402, a first transmit module 404, a second receive module 406, a second transmit module 408, a third receive module 410, an assemble module 412, a third transmit module 414, a fourth transmit module 416, and a fourth receive module 418. The RAN node $102_2$ may also include other components, modules or structures which are well-known, but for clarity, only the components, modules or structures needed to describe the features of the present disclosure are described herein.

The first receive module 402 is configured to receive one or more repetitions of an access request message 204 (e.g., Small Data Request message 204) from the wireless device $104_2$ (for example) (see FIG. 2's step 1 for additional details). The access request message 204 can comprise: (a) an indication of a number of data blocks $202_1$, $202_2$ ... $202_x$ the wireless device $104_2$ intends to transmit to the RAN node $102_2$; and (b) an indication ($N_{TX, DL}$) of a DL coverage class estimated by the wireless device $104_2$. The number of repetitions of the access request message 204 is based on the UL coverage class.

The first transmit module 404 is configured to transmit one or more repetitions of an uplink assignment message 206 to the wireless device $104_2$ (see FIG. 2's step 2 for additional details). The uplink assignment message 206 can comprise: (a) an indication of a number of pre-allocated radio blocks on a packet data traffic channel; (b) an indication ($N_{TX, UL}$) of an UL coverage class; and (c) an indication of a starting point of the pre-allocated radio blocks that the wireless device $104_2$ is to use to transmit a first data block $202_1$ (for example) from the data blocks $202_1$, $202_2$ ... $202_x$ that the wireless device $104_2$ intends to transmit to the RAN node $102_2$; (d): an indication ($N_{TX, DL}$) of a DL coverage class; and (e) an indication of starting points of the pre-allocated radio blocks that the wireless device $104_2$ is to use to transmit data blocks $202_2$ ... $202_x$ (for example) subsequent to the first data block $202_1$ (for example) that the wireless device $104_2$ intends to transmit to the RAN node $102_2$. The number of repetitions of the uplink assignment message 206 is based on the DL coverage class. As discussed above, the pre-allocated radio blocks are allocated by the RAN node $102_2$ such that (1) all repetitions of each of the data blocks $202_1$, $202_2$ ... $202_x$ are to be transmitted contiguously by the wireless device $104_2$, and (2) the pre-allocated radio blocks are allocated such that each of the data blocks $202_1$, $202_2$ ... $202_x$ does not need to be transmitted contiguously with respect to one another by the wireless device $104_2$.

The second receive module 406 is configured to receive from the wireless device $104_2$ a portion of the number of data blocks $202_1$, $202_2$ ... $202_x$ which were indicated in the access request message 204 (see FIG. 2's step 3 for additional details—note: the wireless device $104_2$ transmits all of the data blocks $202_1$, $202_2$ ... $202_x$ and ideally the RAN node $102_2$ would receive all of the data blocks $202_1$, $202_2$ ... $202_x$ but in this example the RAN node $102_2$ does not receive data blocks $202_3$, $202_5$ and $202_{10}$). The RAN node $102_2$ would receive the portion of the number of data blocks $202_1$, $202_2$ ... $202_x$ in the portion of the pre-allocated radio blocks. Plus, each of the received data blocks $202_1$, $202_2$, $202_4$, $202_6$, $202_7$, $202_8$, $202_9$, $202_{11}$ ... $202_x$ (for example) would have been repeated a number of times ($N_{TX, UL}$) by the wireless device $104_2$ according to the UL coverage class.

The second transmit module 408 is configured to transmit one or more repetitions of a first acknowledgment message 208 (e.g., PUAN message 208) to the wireless device $104_2$ (see FIG. 2's step 4 for additional details). The first acknowledgment message 208 comprises: (a) a first bitmap indicating the portion of the number of data blocks $202_1$, $202_2$ ... $202_x$ that have been received and a remaining portion of the number of data blocks $202_1$, $202_2$ ... $202_x$ that have not been received (note: in this example the RAN node $102_2$ did not receive data blocks $202_3$, $202_5$ and $202_{10}$); (b) an indication of another number of pre-allocated radio blocks on the packet data traffic channel that the wireless device $104_2$ is to use to transmit the remaining portion of the number of data blocks $202_1$, $202_2$ ... $202_x$ which in this example are data blocks $202_3$, $202_5$ and $202_{10}$; and (c) an indication ($N_{TX, DL}$) of a DL coverage class. The number of repetitions of the first acknowledgment message 208 is based on the DL coverage class.

The third receive module 410 is configured to receive from the wireless device $104_2$ the remaining portion of the number of data block $202_1$, $202_2$ ... $202_x$ which in this example are data blocks $202_3$, $202_5$ and $202_{10}$ (see FIG. 2's step 5 for additional details). The RAN node $102_2$ would receive the remaining portion of the number of data blocks $202_1$, $202_2$ ... $202_x$ in the pre-allocated radio blocks indicated by the first acknowledgement message 208. Plus, each of the received data blocks $202_3$, $202_5$ and $202_{10}$ would have been repeated a number of times ($N_{TX, UL}$) by the wireless device $104_2$ according to the UL coverage class.

The assemble module 412 is configured to assemble a LLC PDU 209 including the received portion and the received remaining portion of the number of data blocks $202_1$, $202_2$ ... $202_x$ (i.e., all of the data blocks $202_1$, $202_2$ ... $202_x$. The third transmit module 414 is configured to transmit the LLC PDU 209 to the CN node 107 (e.g., SGSN 107) (see FIG. 2 step 6 for additional details).

The fourth transmit module 416 is configured to transmit one or more repetitions of a second acknowledgment message 210 (e.g., PUAN message 210) to the wireless device $104_2$ (see FIG. 2's step 7 for additional details). The second acknowledgment message 210 comprises a second bitmap indicating that all of data blocks $202_1$, $202_2$ ... $202_x$ have been received by the RAN node $102_2$ and a Final Ack Indicator (FAI) indicating completion of the uplink transmission. The number of repetitions of the second acknowledgment message 210 is based on the DL coverage class.

The fourth receive module 418 is configured to receive one or more repetitions of a third acknowledgment message 212 (e.g., Packet Control Ack message 212) from the wireless device $104_2$ (see FIG. 2's step 8 for additional details). The third acknowledgment message 212 comprises an indication that the second acknowledgment message 210 (e.g., PUAN message 210) has been received by the wireless device $104_2$. The third acknowledgment message 212 would have been repeated a number of times ($N_{TX, UL}$) by the wireless device $104_2$ according to the UL coverage class.

As those skilled in the art will appreciate, the above-described modules 402, 404, 406, 408, 410, 412, 414, 416 and 418 of the RAN node $102_2$ (e.g., BSS $102_2$) may be implemented separately as suitable dedicated circuits. Further, the modules 402, 404, 406, 408, 410, 412, 414, 416 and 418 can also be implemented using any number of dedicated circuits through functional combination or separation. In some embodiments, the modules 402, 404, 406, 408, 410, 412, 414, 416 and 418 may be even combined in a single application specific integrated circuit (ASIC). As an alternative software-based implementation, the RAN node $102_2$ (e.g., BSS $102_2$) may comprise a memory $134_2$, a processor $132_2$ (including but not limited to a microprocessor, a microcontroller or a Digital Signal Processor (DSP), etc.) and a transceiver $122_2$. The memory $134_2$ stores machine-readable program code executable by the processor $132_2$ to cause the RAN node $102_2$ (e.g., BSS $102_2$) to perform the steps of the above-described method 300. It should be appreciated that the other RAN node $102_1$ can also be configured in a similar manner as the RAN node $102_2$ to perform method 300.

Figure 5:
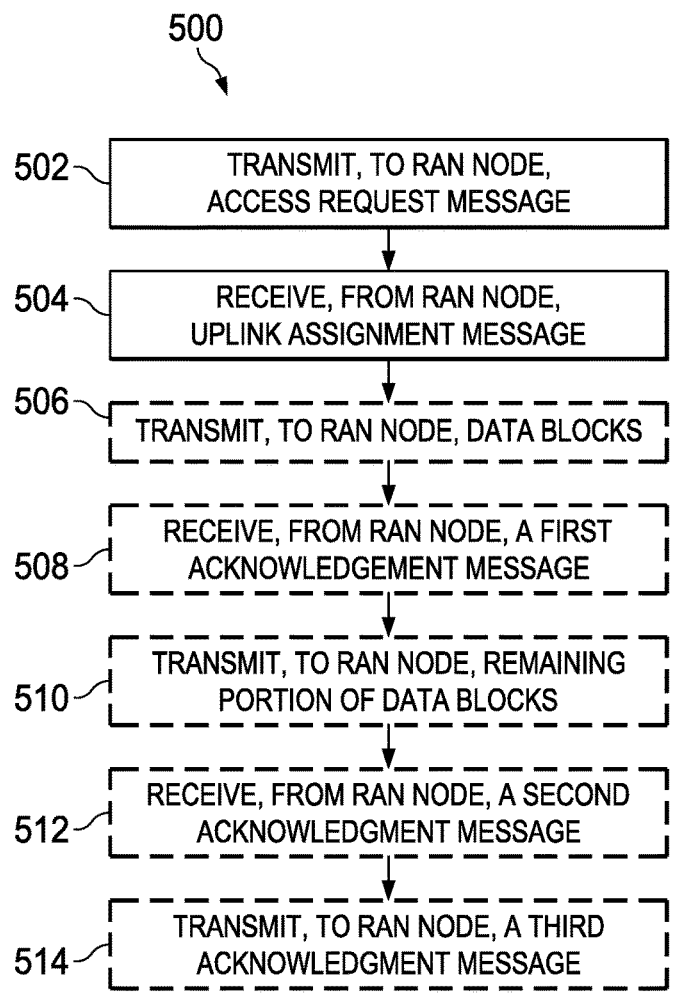
FIG. 5 is a flowchart of a method implemented in the wireless device shown in FIG. 2 in accordance with the an embodiment of the present disclosure.

Referring to FIG. 5, there is a flowchart of a method 500 implemented in a wireless device $104_2$ (for example) in accordance with an embodiment of the present disclosure. At step 502, the wireless device $104_2$ transmits one or more repetitions of an access request message 204 (e.g., Small Data Request message 204) to the RAN node $102_2$ (for example) (see FIG. 2's step 1 for additional details). The access request message 204 can comprise: (a) an indication of a number of data blocks $202_1$, $202_2$ ... $202_x$ the wireless device $104_2$ intends to transmit to the RAN node $102_2$; and (b) an indication ($N_{TX, DL}$) of a DL coverage class estimated by the wireless device $104_2$. The number of repetitions ($N_{TX, UL}$) of the access request message 204 is based on the UL coverage class.

At step 504, the wireless device $104_2$ receives one or more repetitions of an uplink assignment message 206 from the RAN node $102_2$ (see FIG. 2's step 2 for additional details). The uplink assignment message 206 can comprise: (a) an indication of a number of pre-allocated radio blocks on a packet data traffic channel; (b) an indication ($N_{TX, UL}$) of an UL coverage class; and (c) an indication of a starting point of the pre-allocated radio blocks that the wireless device $104_2$ is to use to transmit a first data block $202_1$ (for example) from the data blocks $202_1$, $202_2$ ... $202_x$ that the wireless device $104_2$ intends to transmit to the RAN node $102_2$; (d): an indication ($N_{TX, DL}$) of a DL coverage class; and (e) an indication of starting points of the remaining pre-allocated radio blocks that the wireless device $104_2$ is to use to transmit the remaining data blocks $202_2$ ... $202_x$ (for example) from the data blocks $202_1$, $202_2$ ... $202_x$ that the wireless device $104_2$ intends to transmit to the RAN node $102_2$. The number of repetitions of the uplink assignment message 206 is based on the DL coverage class. As discussed above, the pre-allocated radio blocks are allocated by the RAN node $102_2$ such that (1) all repetitions of each of the data blocks $202_1$, $202_2$ ... $202_x$ are to be transmitted contiguously by the wireless device $104_2$, and (2) the pre-allocated radio blocks are allocated such that each of the data blocks $202_1$, $202_2$ ... $202_x$ does not need to be transmitted contiguously with respect to one another by the wireless device $104_2$.

At step 506, the wireless device $104_2$ transmits the data blocks $202_1$, $202_2$ ... $202_x$ which were indicated in the access request message 204 to the RAN node $102_2$ (see FIG. 2's step 3 for additional details—note: the wireless device $104_2$ in this example transmits all of the data blocks $202_1$, $202_2$ ... $202_x$ and ideally the RAN node $102_2$ would receive all of the data blocks $202_1$, $202_2$ ... $202_x$ but in this example the RAN node $102_2$ does not receive data blocks $202_3$, $202_5$ and $202_{10}$). The wireless device $104_2$ transmits data blocks $202_1$, $202_2$ ... $202_x$ in the pre-allocated radio blocks. Plus, each of the transmitted data blocks $202_1$, $202_2$ ... $202_x$ would have been repeated a number of times ($N_{TX, UL}$) by the wireless device $104_2$ according to the UL coverage class.

At step 508, the wireless device $104_2$ receives one or more repetitions of a first acknowledgment message 208 (e.g., PUAN message 208) from the RAN node $102_2$ (see FIG. 2's step 4 for additional details). The first acknowledgment message 208 comprises: (a) a first bitmap indicating the portion of the number of data blocks $202_1$, $202_2$ ... $202_x$ that have been received by the RAN node $102_2$ and a remaining portion of the number of data blocks $202_1$, $202_2$ ... $202_x$ that have not been received by the RAN node $102_2$ (note: in this example the RAN node $102_2$ did not receive data blocks $202_3$, $202_5$ and $202_{10}$); (b) an indication of another number of pre-allocated radio blocks on the packet data traffic channel that the wireless device $104_2$ is to use to transmit the remaining portion of the number of data blocks $202_1$, $202_2$ ... $202_x$ which in this example are data blocks $202_3$, $202_5$ and $202_{10}$; and (c) an indication ($N_{TX, DL}$) of an DL coverage class. The number of repetitions of the first acknowledgment message 208 is based on the DL coverage class.

At step 510, the wireless device $104_2$ transmits the remaining portion of the number of data block $202_1$, $202_2 \ldots 202_x$ which in this example are data blocks $202_3$, $202_5$ and $202_{10}$ to the RAN node $102_2$ (see FIG. 2's step 5 for additional details). The RAN node $102_2$ would receive the remaining portion of the number of data blocks $202_1$, $202_2 \ldots 202_X$ in the pre-allocated radio blocks indicated by the first acknowledgement message 208. Plus, each of the received data blocks $202_3$, $202_5$ and $202_{10}$ would have been repeated a number of times ($N_{TX, UL}$) by the wireless device $104_2$ according to the UL coverage class.

At step 512, the wireless device $104_2$ receives one or more repetitions of a second acknowledgment message 210 (e.g., PUAN message 210) from the RAN node $102_2$ (see FIG. 2's step 7 for additional details). The second acknowledgment message 210 comprises a second bitmap indicating that all of data blocks $202_1$, $202_2 \ldots 202_X$ have been received by the RAN node $102_2$ and a Final Ack Indicator (FAI) indicating completion of the uplink transmission. The number of repetitions of the second acknowledgment message 210 is based on the DL coverage class.

At step 514, the wireless device $104_2$ transmits one or more repetitions of a third acknowledgment message 212 (e.g., Packet Control Ack message 212) to the RAN node $102_2$ (see FIG. 2's step 8 for additional details). The third acknowledgment message 212 comprises an indication that the second acknowledgment message 210 (e.g., PUAN message 210) has been received by the wireless device $104_2$. The third acknowledgment message 212 is repeated a number of times ($N_{TX, UL}$) by the wireless device $104_2$ according to the UL coverage class. The other wireless device $104_1$, $104_3 \ldots 104_n$ can also be configured in a similar manner to perform method 500.

Figure 6:
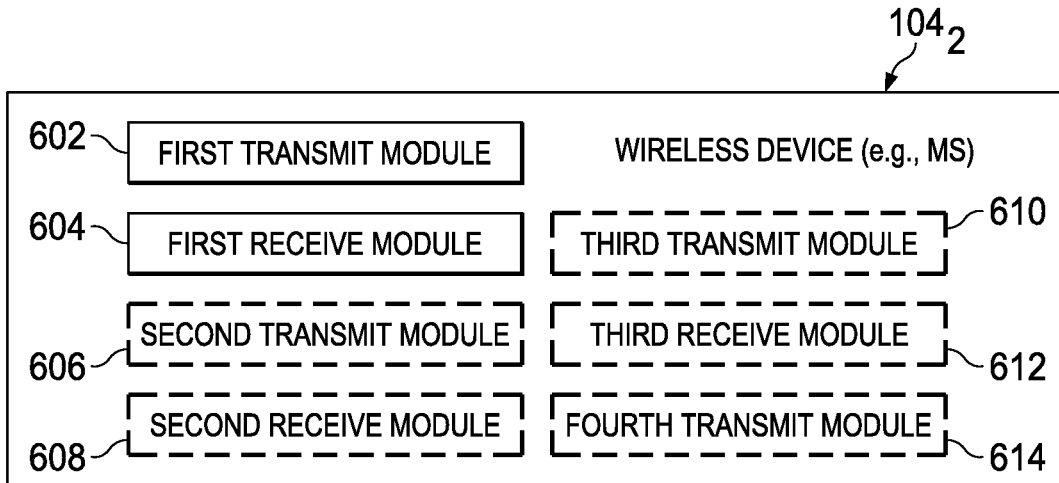
FIG. 6 is a block diagram illustrating an exemplary structure of the wireless device shown in FIG. 2 configured in accordance with an embodiment of the present disclosure.

Referring to FIG. 6, there is a block diagram illustrating structures of an exemplary wireless device $104_2$ (for example) configured in accordance with an embodiment of the present disclosure. In one embodiment, the wireless device $104_2$ may comprise a first transmit module 602, a first receive module 604, a second transmit module 606, a second receive module 608, a third transmit module 610, a third receive module 612, and fourth transmit module 614. The wireless device $104_2$ may also include other components, modules or structures which are well-known, but for clarity, only the components, modules or structures needed to describe the features of the present disclosure are described herein.

The first transmit module 602 is configured to transmit one or more repetitions of an access request message 204 (e.g., Small Data Request message 204) to the RAN node $102_2$ (for example) (see FIG. 2's step 1 for additional details). The access request message 204 can comprise: (a) an indication of a number of data blocks $202_1$, $202_2 \ldots 202_x$ the wireless device $104_2$ intends to transmit to the RAN node $102_2$; and (b) an indication ($N_{TX, DL}$) of a DL coverage class estimated by the wireless device $104_2$. The number of repetitions of the access request message 204 is based on the UL coverage class.

The first receive module 604 is configured to receive one or more repetitions of an uplink assignment message 206 from the RAN node $102_2$ (see FIG. 2's step 2 for additional details). The uplink assignment message 206 can comprise: (a) an indication of a number of pre-allocated radio blocks on a packet data traffic channel; (b) an indication ($N_{TX, UL}$) of an UL coverage class; and (c) an indication of a starting point of the pre-allocated radio blocks that the wireless device $104_2$ is to use to transmit a first data block $202_1$ (for example) from the data blocks $202_1$, $202_2 \ldots 202_x$ that the wireless device $104_2$ intends to transmit to the RAN node $102_2$; (d): an indication ($N_{TX, DL}$) of a DL coverage class; and (e) an indication of starting points of the remaining pre-allocated radio blocks that the wireless device $104_2$ is to use to transmit the remaining data blocks $202_2 \ldots 202_x$ (for example) from the data blocks $202_1$, $202_2 \ldots 202_x$ that the wireless device $104_2$ intends to transmit to the RAN node $102_2$. The number of repetitions of the uplink assignment message 206 is based on the DL coverage class. As discussed above, the pre-allocated radio blocks are allocated by the RAN node $102_2$ such that (1) all repetitions of each of the data blocks $202_1$, $202_2 \ldots 202_x$ are to be transmitted contiguously by the wireless device $104_2$, and (2) the pre-allocated radio blocks are allocated such that each of the data blocks $202_1$, $202_2 \ldots 202_x$ does not need to be transmitted contiguously with respect to one another by the wireless device $104_2$.

The second transmit module 606 is configured to transmit the data blocks $202_1$, $202_2 \ldots 202_x$ which were indicated in the access request message 204 to the RAN node $102_2$ (see FIG. 2's step 3 for additional details—note: the wireless device $104_2$ in this example transmits all of the data blocks $202_1$, $202_2 \ldots 202_x$ and ideally the RAN node $102_2$ would receive all of the data blocks $202_1$, $202_2 \ldots 202_x$ but in this example the RAN node $102_2$ does not receive data blocks $202_3$, $202_5$ and $202_{10}$). The wireless device $104_2$ transmits data blocks $202_1$, $202_2 \ldots 202_x$ in the pre-allocated radio blocks. Plus, each of the transmitted data blocks $202_1$, $202_2 \ldots 202_x$ would have been repeated a number of times ($N_{TX}$, by the wireless device $104_2$ according to the UL coverage class.

The second receive module 608 is configured to receive one or more repetitions of a first acknowledgment message 208 (e.g., PUAN message 208) from the RAN node $102_2$ (see FIG. 2's step 4 for additional details). The first acknowledgment message 208 comprises: (a) a first bitmap indicating the portion of the number of data blocks $202_1$, $202_2 \ldots 202_x$ that have been received by the RAN node $102_2$ and a remaining portion of the number of data blocks $202_1$, $202_2 \ldots 202_x$ that have not been received by the RAN node $102_2$ (note: in this example the RAN node $102_2$ did not receive data blocks $202_3$, $202_5$ and $202_{10}$); (b) an indication of another number of pre-allocated radio blocks on the packet data traffic channel that the wireless device $104_2$ is to use to transmit the remaining portion of the number of data blocks $202_1$, $202_2 \ldots 202_x$ which in this example are data blocks $202_3$, $202_5$ and $202_{10}$; and (c) an indication of an DL coverage class ($N_{TX, DL}$). The number of repetitions of the first acknowledgment message 208 is based on the DL coverage class.

The third transmit module 610 is configured to transmit the remaining portion of the number of data block $202_1$, $202_2 \ldots 202_x$ which in this example are data blocks $202_3$, $202_5$ and $202_{10}$ to the RAN node $102_2$ (see FIG. 2's step 5 for additional details). The RAN node $102_2$ would receive the remaining portion of the number of data blocks $202_1$, $202_2 \ldots 202_x$ in the pre-allocated radio blocks indicated by the first acknowledgement message 208. Plus, each of the received data blocks $202_3$, $202_5$ and $202_{10}$ would have been repeated a number of times ($N_{TX, UL}$) by the wireless device $104_2$ according to the UL coverage class.

The third receive module 612 is configured to receive receives one or more repetitions of a second acknowledgment message 210 (e.g., PUAN message 210) from the RAN node $102_2$ (see FIG. 2's step 7 for additional details). The second acknowledgment message 210 comprises a second bitmap indicating that all of data blocks $202_1$, $202_2 \ldots 202_x$ have been received by the RAN node $102_2$ and a Final Ack Indicator (FAI) indicating completion of the uplink transmission. The number of repetitions of the second acknowledgment message 210 is based on the DL coverage class.

The fourth transmit module 614 is configured to transmit one or more repetitions of a third acknowledgment message 212 (e.g., Packet Control Ack message 212) to the RAN node $102_2$ (see FIG. 2's step 8 for additional details). The third acknowledgment message 212 comprises an indication that the second acknowledgment message 210 (e.g., PUAN message 210) has been received by the wireless device $104_2$. The third acknowledgment message 212 is repeated a number of times ($N_{TX, UL}$) by the wireless device $104_2$ according to the UL coverage class.

As those skilled in the art will appreciate, the above-described modules 602, 604, 606, 608, 610, 612, and 614 of the wireless device $104_2$ (e.g., MS $104_2$) may be implemented separately as suitable dedicated circuits. Further, the modules 602, 604, 606, 608, 610, 612, and 614 can also be implemented using any number of dedicated circuits through functional combination or separation. In some embodiments, the modules 602, 604, 606, 608, 610, 612, and 614 may be even combined in a single application specific integrated circuit (ASIC). As an alternative software-based implementation, the wireless device $104_2$ may comprise a memory $120_2$, a processor $118_2$ (including but not limited to a microprocessor, a microcontroller or a Digital Signal Processor (DSP), etc.) and a transceiver $110_2$. The memory $120_2$ stores machine-readable program code executable by the processor $118_2$ to cause the wireless device $104_2$ to perform the steps of the above-described method 500. It should be appreciated that the other wireless devices $104_1$, $104_3$ ... $104_n$ can also be configured in a similar manner as the wireless device $104_2$ to perform method 500.

Flexible Downlink Allocation Technique

The Flexible Downlink Allocation (FDA) technique is used on the downlink of an EC-PDTCH when the RAN node $102_2$ (e.g., BSS $102_2$) transmits to the wireless device $104_2$ (for example) a Downlink Assignment message 720 that indicates the earliest possible starting point at which the wireless device $104_2$ is to start looking for the possible arrival of DL RLC data blocks $702_1, 702_2, 702_3 \ldots 702_x$ (downlink payload) on DL EC-PDTCH resources that have been assigned to the wireless device $104_2$, as briefly described below and then described in more detail with respect to FIGS. 7-16.

A feature of the FDA technique is that the wireless device $104_2$ is told to expect, in the downlink assignment message 718 (e.g., EC-AGCH Resource Assignment message 718), a variable number of DL RLC data blocks $702_1, 702_2, 702_3 \ldots 702_x$ over up to 4 timeslots, where each RLC data block $702_1, 702_2, 702_3 \ldots 702_x$ is repeated according to a value for $N_{TX, DL}$ indicated by the downlink assignment message 720.

The RAN node $102_2$ (e.g., BSS $102_2$) transmits all repetitions of a specific RLC data block $702_1, 702_2, 702_3 \ldots 702_x$ contiguously but does not need to transmit each of the RLC data blocks $702_1, 702_2, 702_3 \ldots 702_x$ contiguous to each other. As such, the wireless device $104_2$ will not know the precise starting point of any of the RLC data blocks $702_1, 702_2, 702_3 \ldots 702_x$ after receiving the downlink assignment message 720 (other than knowing that the RLC data blocks $702_1, 702_2, 702_3 \ldots 702_x$ will be transmitted according to the wireless device $104_2$'s $N_{TX, DL}$) but will know that each RLC data block $702_1, 702_2, 702_3 \ldots 702_x$ will be sent by the RAN node $102_2$ (e.g., BSS $102_2$) using contiguous radio blocks.

The point at which the wireless device $104_2$ stops attempting to receive RLC data blocks $702_1, 702_2, 702_3 \ldots 702_x$ is determined according to when the wireless device $104_2$ is polled to send a Packet Downlink Ack/Nack (PDAN) message 720 on the UL EC-PACCH. In other words, the number of additional RLC data blocks $702_1, 702_2, 702_3 \ldots 702_x$ that the wireless device $104_2$ receives after receiving the first RLC data block $702_1$ (for example) is variable, but any additional RLC data blocks $702_2, 702_3 \ldots 702_x$ need to arrive prior to when the wireless device $104_2$ is polled to send the PDAN message 720 (i.e., the wireless device $104_2$ will not look for additional DL RLC data blocks $702_2, 702_3 \ldots 702_x$ while completing the transmission of the PDAN message 720).

When searching for the first radio block used to send any given RLC data block $702_1, 702_2, 702_3 \ldots 702_x$, the wireless device $104_2$ examines fixed sets of EC-PDTCH blocks based on $N_{TX, DL}$. For example, if the wireless device $104_2$ uses $N_{TX, DL}=2$ (i.e., 2 blind repetitions) then it will only look at fixed pairs of EC-PDTCH blocks in an attempt to receive a RLC data block $702_1, 702_2, 702_3 \ldots 702_x$. As such, the wireless device $104_2$ will view each 52-multiframe on a monitored TS as potentially containing 6 pairs of EC-PDTCH blocks, where any one of these pairs may potentially contain an expected RLC data block $702_1, 702_2, 702_3 \ldots 702_x$.

Figure 7:
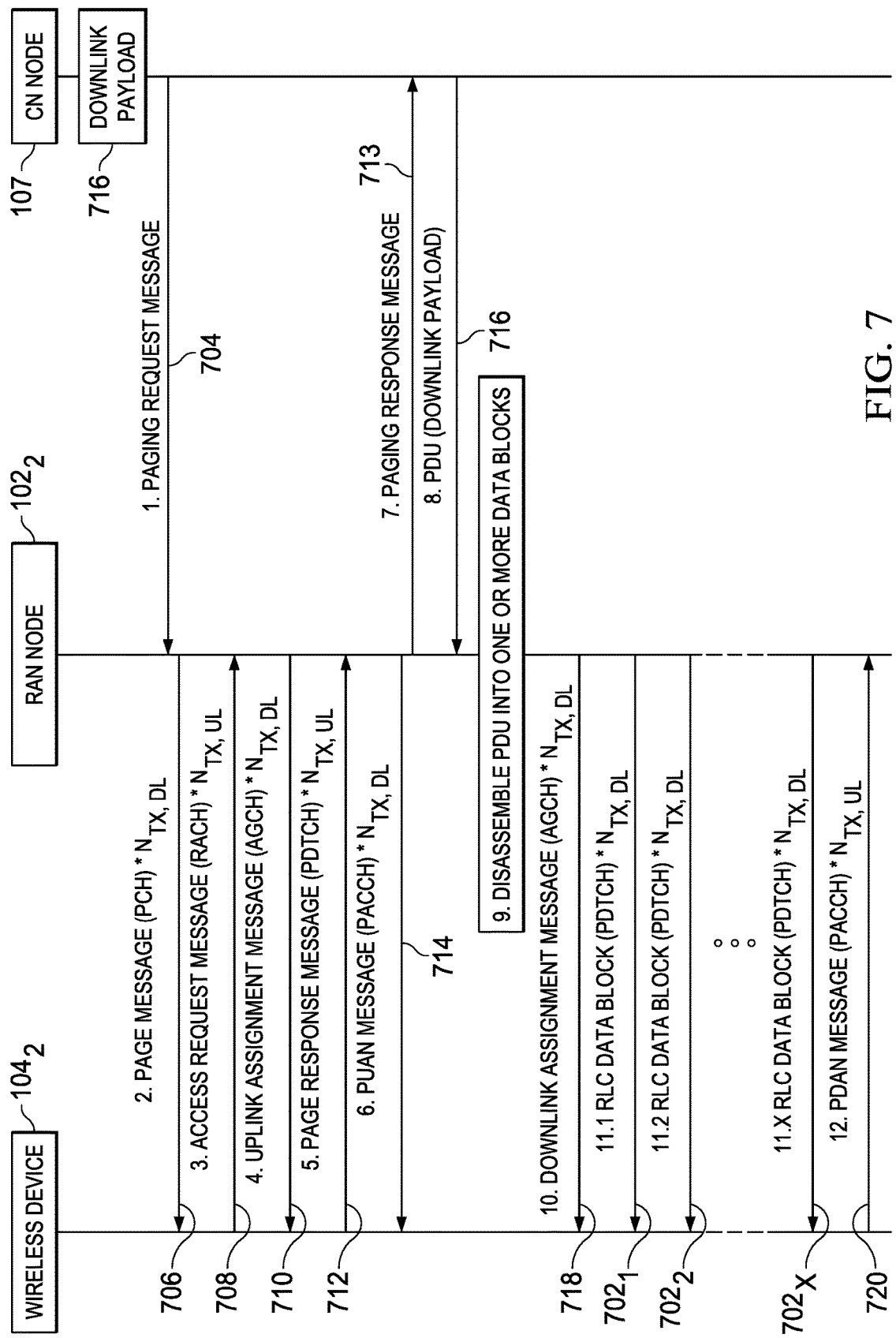
FIG. 7 is a signal flow diagram illustrating the signaling associated with a wireless device receiving a downlink small data transmission from a RAN node utilizing a flexible downlink allocation technique in accordance with an embodiment of the present disclosure.

One exemplary sequence of signaling steps associated with the FDA technique is illustrated in FIG. 7 and described in detail below with respect to a scenario where the RAN node $102_2$ has small data transmissions to transmit to the wireless device $104_2$ (e.g., IoT device $104_2$) which has an uplink coverage class needing $N_{TX, UL}$ repetitions, and a downlink coverage class needing $N_{TX, DL}$ repetitions. The exemplary signaling steps associated with the wireless device $104_2$ receiving small data transmissions from the RAN node $102_2$ are as follows:

Step 1:

The CN node 107 (e.g., SGSN 107) receives some downlink payload 716 (e.g., an IP packet) for the wireless device $104_2$ and acts on the payload 716 by transmitting to the RAN node $102_2$ (e.g., BSS $102_2$) a Paging Request message 704 indicating the International Mobile Subscriber Identity (IMSI), the extended discontinuous receive (eDRX) cycle length, and the $N_{TX, DL}$ of the wireless device $104_2$, where the indicated $N_{TX, DL}$ is based on the DL coverage class last indicated by the wireless device $104_2$ (e.g., within a Routing Area Update (RAU) Request message).

Step 2:

The RAN node $102_2$ (e.g., BSS $102_2$) transmits one or more repetitions of a Page message 706 on the EC-Paging Channel (PCH) to the wireless device $104_2$ using the nominal paging group of the wireless device $104_2$. The RAN node $102_2$ (e.g., BSS $102_2$) can determine the nominal paging group of the wireless device $104_2$ using the IMSI, the eDRX cycle length, the number of EC-PCH blocks per 51-multiframe, and the $N_{TX, DL}$ of the wireless device $104_2$ as follows:

Each eDRX cycle consists of Y 51-multiframes subject to the restriction that each eDRX cycle needs to occur an integral number of times within the overall Time Division Multiple Access (TDMA) Frame Number (FN) space.

The number of paging groups per eDRX cycle is determined on a coverage class basis, where the RAN node $102_2$ (e.g., BSS $102_2$) first determines the nominal paging group of the wireless device $104_2$ assuming $N_{TX, DL}=1$, which effectively determines a window of four 51-multiframes in which the wireless device $104_2$ will wake-up to attempt to read according to its actual nominal paging group.

The specific EC-PCH blocks that the wireless device $104_2$ considers to be its nominal paging group within the four 51-multiframe window is determined based on the DL coverage class last indicated by the wireless device $104_2$.

Step 3:

The wireless device $104_2$ transmits one or more repetitions of an access request message 708 on the EC-RACH to the RAN node $102_2$ (e.g., BSS $102_2$). The access request message 708 is requesting resources for sending a Page Response message 712 (see step 5). The number of repetitions used to transmit the access request message 708 is based on the wireless device $104_2$'s estimated UL coverage class $N_{TX, UL}$ (a single repetition is always used by the wireless device $104_2$ when in normal coverage). The access request message 708 can be configured as follows:

The information the wireless device $104_2$ can include within the access request message 708 is indicated by TABLE #2 and discussed in more detail next:

An indication of whether or not the wireless device $104_2$ supports MCS-5 through MCS-9 is indicted by the TSC used when transmitting the access request message 708 as per legacy operation.

The access request message 708 that is transmitted on the EC-RACH includes an indication of the DL coverage class estimated by the wireless device $104_2$.

System Information (SI) sent on TS1 indicates that if a wireless device $104_2$ (for example) is in normal coverage ($N_{TX, UL}=N_{TX, DL}=1$) then it is to perform a system access using the RACH of TS0 or the RACH of TS1. Note: the System Information could be transmitted by the RAN node $102_2$ before the RAN node $102_2$ transmits the Page message 706.

TABLE #2

Content of Access Request Message 708

| Type of Access | Number of MCS-1 Coded | Spare Bit | Random Bits | DL Coverage | Device Identity |
|---|---|---|---|---|---|
| AB on TS0 | Yes (0000 = page response | Yes | Yes | No[1] | No |
| AB on TS1 | Yes (0000 = page response | Yes | Yes | Yes | No |
| NB on TS0 | Yes | No | No | No[1] | Yes |
| NB on TS1 | Yes | No | No | Yes | Yes |

NOTE[1]
Not needed since the access is always when in normal coverage on UL and DL Step 4:

The RAN node $102_2$ (e.g., BSS $102_2$) transmits one or more repetitions of an Uplink Assignment message 710 on the EC-AGCH to the wireless device $104_2$. The number of repetitions used by RAN node $102_2$ (e.g., BSS $102_2$) when transmitting the Uplink Assignment message 710 is indicated by the $N_{TX, DL}$ value included in the Page Response Request message 708. The Uplink Assignment message 710 includes the same assignment information as per the Uplink Assignment message 206 as described above with respect to FIG. 2's Step 2 of the Fixed Uplink Allocation technique but for the case where X=1.

Step 5:

Similar to FIG. 2's Step 3 of the Fixed Uplink Allocation technique, a HARQ scheme is used by the wireless device $104_2$ for transmitting to the RAN node $102_2$ the uplink payload (e.g., a Page Response message 712 consisting of a dummy LLC PDU) using the $N_{TX, UL}$ pre-allocated UL radio blocks, wherein, after transmitting the uplink payload (Page Response 712) the wireless device $104_2$ waits for a corresponding PUAN message 714.

Step 6:

The RAN node $102_2$ (e.g., BSS $102_2$) transmits the PUAN message 714 after attempting to receive the $N_{TX, UL}$ pre-allocated UL radio blocks (Page Response 712) from the wireless device $104_2$. After transmitting the Page Response 712, the wireless device $104_2$ attempts to receive the PUAN message 714 starting within the first possible set of EC-PACCH blocks corresponding to the wireless device $104_2$'s assigned DL coverage class, as per FIG. 2's Step 4 of the Fixed Uplink Allocation technique and discussed next:

After receiving the PUAN message 714, the wireless device $104_2$ releases the UL Temporary Block Flow (TBF) resources, moves to the EC-Idle state, where the wireless device $104_2$ then monitors the EC-AGCH using a short DRX cycle (e.g., as per legacy) in expectation of a DL TBF resource assignment message 718.

Alternatively, the PUAN message 714 can include a DL TBF resource assignment message 715, and an indication where the wireless device $104_2$ is to start looking for RLC data blocks $702_1$, $702_2$, $702_3$ ... $702_x$ thereon according to a DRX cycle after first waiting a certain time period (e.g., as indicated by the information within the PUAN message 714). This technique will save the wireless device $104_2$ from having to receive an additional EC-AGCH message 718. This technique is discussed in detail below with respect to FIGS. 12-16.

Step 7:

The RAN node $102_2$ (e.g., BSS $102_2$) transmits a Paging Response message 713 (e.g., a dummy LLC PDU) to the CN node 107 (e.g., SGSN 107).

Step 8:

The CN node 107 (e.g., SGSN 107) transmits a PDU including the pending downlink user plane payload 716 to the RAN node $102_2$ (e.g., BSS $102_2$) from which the CN node 107 (e.g., SGSN 107) received the Paging Response message 713.

Step 9:

The RAN node $102_2$ (e.g., BSS $102_2$) disassembles the PDU including the pending downlink user plane payload 716 into one or more RLC data blocks $702_1$, $702_2$, $702_3$ ... $702_x$ appropriate for transmitting to the wireless device $104_2$ over the radio interface.

Step 10:

The RAN node $102_2$ (e.g., BSS $102_2$) transmits one or more repetitions of a Downlink Assignment message 718 on the EC-AGCH to the wireless device $104_2$. The number of repetitions of the Downlink Assignment message 718 is determined by using the downlink coverage class $N_{TX, DL}$ that was last received by the RAN node $102_2$ (e.g., BSS $102_2$). The Downlink Assignment message 718 has the following features:

The Downlink Assignment message 718 indicates the assigned DL EC-PDTCH resources (e.g., timeslots), an optional indication of when the wireless device $104_2$ is to start looking for the first of the DL RLC data blocks $702_1$ (e.g., expressed as an offset relative to where the Downlink Assignment message 718 is received), the UL coverage class $N_{TX, UL}$ to be used, and the DL coverage class $N_{TX, DL}$ to be used over the set of assigned timeslots.

Step 11:

A HARQ scheme is used by the RAN node $102_2$ (e.g., BSS $102_2$) for transmitting to the wireless device $104_2$ the downlink payload 716 (RLC data blocks $702_1$, $702_2$, $702_3$ ... $702_x$). The wireless device $104_2$ may be polled for a PDAN message 720 within one or more of the variable number of RLC data blocks $702_1$, $702_2$, $702_3$ ... $702_x$ transmitted to the wireless device $104_2$ prior to the point in time where the PDAN message 720 is to be transmitted. The following is a discussion about how the wireless device $104_2$ can function to receive the RLC data blocks $702_1$, $702_2$, $702_3$ ... $702_x$:

- When attempting to find a DL RLC data block $702_1$ (for example), the wireless device $104_2$ examines fixed sets of EC-PDTCH blocks based on the wireless device $104_2$'s coverage class. For example, if the wireless device $104_2$ uses $N_{TX, DL}=2$ (i.e., 2 blind repetitions) then it will only look at fixed pairs of EC-PDTCH blocks in an attempt to receive a RLC data block $702_1$ (for example) addressed to the wireless device $104_2$'s assigned TFI on the wireless device $104_2$'s assigned timeslots. As such, the wireless device $104_2$ will view each 52-multiframe on a monitored TS as potentially containing 6 pairs of EC-PDTCH blocks, where any one of these pairs may potentially contain an expected RLC data block $702_1$.
- If the RLC data block $702_1$ is not received within a set of applicable EC-PDTCH blocks, then the wireless device $104_2$ continues to read additional sets of EC-PDTCH blocks applicable to the wireless device $104_2$'s downlink coverage class.
- For example, if the downlink payload 716 transmission consists of 5 MCS-1 RLC data blocks (X=5) and the $N_{TX, DL}$ indicates 8 repetitions are needed, then a total of 40 radio blocks ($X*N_{TX, DL}$) need to be transmitted. These 40 radio blocks will be transmitted using 5 instances of 8 contiguous radio blocks over the set of assigned timeslots. The time period between the transmissions of any two successive RLC data blocks (i.e., between instances of 8 contiguous radio blocks) is variable, although the Downlink Assignment message 718 may optionally indicate what this time period is in the interest of the wireless device $104_2$'s battery conservation.
- The polling may be performed by including a polling field within a set of one or more RLC data blocks $702_1$, $702_2$, $702_3$ ... $702_x$, where the polling field in each RLC data block $702_1$, $702_2$, $702_3$ ... $702_x$ indicates the same point in time at which the wireless device $104_2$ is to transmit a PDAN message 720 on the UL EC-PACCH to the RAN node $102_2$ (e.g., BSS $102_2$).

Step 12:

The PDAN message 720 is transmitted by the wireless device $104_2$ on the UL EC-PACCH to the RAN node $102_2$ (e.g., BSS $102_2$), wherein the location of the first pre-allocated UL EC-PACCH block used to transmit the PDAN message 720 is indicated by the polling information included in one or more of the RLC data blocks $702_1$, $702_2$, $702_3$ ... $702_x$ transmitted to the wireless device $104_2$. The following is a more detailed discussion about the transmission and reception of the PDAN message 720:

- The location of the first UL EC-PACCH block used to transmit the PDAN message 720 may be expressed as an offset relative to DL RLC data block $702_1$ (for example) from which the polling information was read.
- Alternatively, if the downlink assignment information indicates that a specific number of DL RLC data blocks $702_1$, $702_2$, $702_3$ ... $702_x$ will be transmitted contiguously prior to polling, then upon receiving the last DL radio block $702_n$ used to convey the DL RLC data blocks $702_1$, $702_2$, $702_3$ ... $702_x$, the wireless device $104_2$ can transmit the PDAN message 720 using an offset (e.g., fixed or indicated by the downlink assignment message 718) from the last DL radio block $702_x$ to determine where to start transmitting the PDAN message 720. This same principle can be used where the wireless device $104_2$ has sent a PDAN message 720 indicating that one or more DL RLC data blocks $702_2$ (for example) need to be resent (i.e., the wireless device $104_2$ will expect all resent DL RC data blocks $702_2$ (for example) to be transmitted contiguously and thereby determine where to transmit the corresponding PDAN message 720).
- $N_{TX, UL}$ contiguous radio blocks are pre-allocated for transmission of the PDAN message 720.
- If the RAN node $102_2$ (e.g., BSS $102_2$) does not receive the PDAN message 720 within the pre-allocated UL radio blocks, then the RAN node $102_2$ (e.g., BSS $102_2$) may resend a DL RLC data block $702_1$ (for example) including polling information (a repeated poll).
- As such, after the wireless device $104_2$ receives a DL RLC data block $702x$ (for example) including polling information and transmits the corresponding PDAN message indicating all DL RLC data blocks $702_1$, $702_2$, $702_3$ ... $702_x$ have been received, the wireless device $104_2$ should wait a limited amount of time (e.g., indicated by the assignment message 718) and then start looking for the possible reception of a previously received DL RLC data block $702_1$ (for example) including polling information. This allows for the case where the RAN node $102_2$ does not receive the PDAN message 720 sent by the wireless device $104_2$ in response to the repeated poll.
- If the wireless device $104_2$ is polled again within this limited time window, the wireless device $104_2$ should transmit another PDAN message 720 using the specific set of pre-allocated $N_{TX, UL}$ radio blocks as indicated by the repeated poll. Otherwise, the wireless device $104_2$ should release the DL TBF and enter the EC-Idle state.
- When transmitting the PDAN message 720 indicating that one or more DL RLC data blocks $702_2$ (for example) have not been received, the wireless device $104_2$ should continue to monitor the assigned DL PDTCH resources for reception of the missing RLC data blocks $702_2$ (for example) and then proceed, as per Step 11.

Figure 8:
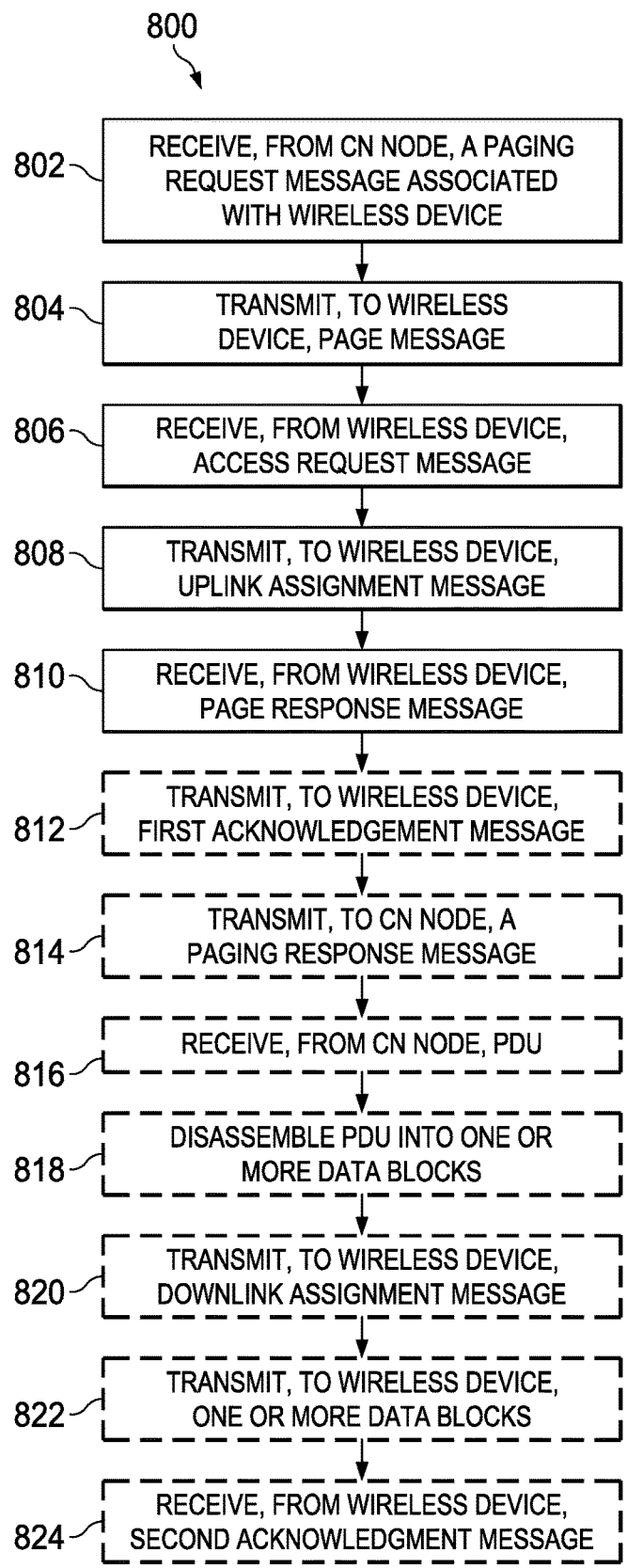
FIG. 8 is a flowchart of a method implemented in the RAN node shown in FIG. 7 in accordance with an embodiment of the present disclosure.

Referring to FIG. 8, there is a flowchart of a method 800 implemented in a RAN node $102_2$ (for example) in accordance with an embodiment of the present disclosure. At step 802, the RAN node $102_2$ receives the paging request message 704 from the CN node 107. The paging request message 704 is associated with the wireless device $104_2$ (for example) (see FIG. 7's step 1 for additional details).

At step 804, the RAN node $102_2$ transmits one or more repetitions of the page message 706 to the wireless device $104_2$ (see FIG. 7's step 2 for additional details). The number of repetitions of the page message 706 is based on the DL coverage class $N_{TX, DL}$.

At step 806, the RAN node $102_2$ receives one or more repetitions of the access request message 708 from the wireless device $104_2$ (see FIG. 7's step 3 for additional details). The access request message 708 requests resources for sending a Page Response message 712 and includes an indication ($N_{TX,\ DL}$) of a DL coverage class. The number of repetitions ($N_{TX,\ UL}$) of the access request message 708 is based on the UL coverage class.

At step 808, the RAN node 102$_2$ transmits one or more repetitions of the uplink assignment message 712 to the wireless device 104$_2$ (see FIG. 7's step 4 for additional details). The uplink assignment message 712 can comprise: (a) an indication of a number of pre-allocated radio block(s) on a packet data traffic channel; (b) an indication ($N_{TX,\ UL}$) of an UL coverage class; (c) an indication ($N_{TX,\ DL}$) of a DL coverage class; and (d) an indication of when the wireless device 104$_2$ is to start looking for a first data block 702$_1$ (for example) from the RAN node 102$_2$. The number of repetitions of the uplink assignment message 712 is based on the DL coverage class.

At step 810, the RAN node 102$_2$ receives one or more repetitions of the page response message 712 from the wireless device 104$_2$ (see FIG. 7's step 5 for additional details). The page response message 712 can comprise: uplink payload (e.g., a dummy LLC PDU), where the uplink payload is received in the pre-allocated radio block(s). The page response message 712 is repeated according to the UL coverage class.

At step 812, the RAN node 102$_2$ transmits one or more repetitions of the first acknowledgment message 714 (e.g., PUAN message 714) to the wireless device 104$_2$ (see FIG. 7's step 6 for additional details). The first acknowledgment message 714 can comprise: a first bitmap indicating receipt of the page response message 712 by the RAN node 102$_2$ and a Final Ack Indicator (FAI) indicating completion of the uplink transmission. The number of repetitions of the first acknowledgment message 714 is based on the DL coverage class.

At step 814, the RAN node 102$_2$ transmits the paging response message 713 to the CN node 107 (see FIG. 7's step 7 for additional details).

At step 816, the RAN node 102$_2$ receives a PDU including the downlink payload 716 from the CN node 107 (see FIG. 7's step 8 for additional details).

At step 818, the RAN node 102$_2$ disassembles the PDU including the downlink payload 716 into one or more data blocks 702$_1$, 702$_2$ . . . 702$_x$ appropriate for transmission to the wireless device 1042 over the radio interface (see FIG. 7's step 9 for additional details).

At step 820, the RAN node 102$_2$ transmits one or more repetitions of the downlink assignment message 718 to the wireless device 104$_2$ (see FIG. 7's step 10 for additional details). The downlink assignment message 718 can comprise: (a) an indication of assigned DL resources on the packet data traffic channel; (b) an indication ($N_{TX,\ DL}$) of a DL coverage class; and (c) an indication of when the wireless device 104$_2$ is to start looking for a first data block 702$_1$ (for example) from the RAN node 102$_2$. The number of repetitions of the downlink assignment message 718 is based on the DL coverage class.

At step 822, the RAN node 102$_2$ transmits to the wireless device 104$_2$ one or more repetitions of each of the data blocks 702$_1$, 702$_2$ . . . 702$_x$ using the assigned DL resources (see FIG. 7's step 11 for additional details). The number of repetitions of each of the data blocks 702$_1$, 702$_2$ . . . 702$_x$ is based on the DL coverage class. Further, all repetitions of each of the data blocks 702$_1$, 702$_2$ . . . 702$_x$ are transmitted contiguously to the wireless device 104$_2$, and each of the data blocks 702$_1$, 702$_2$ . . . 702$_x$ does not need to be transmitted contiguously with respect to one another to the wireless device 104$_2$.

At step 824, the RAN node 102$_2$ receives one or more repetitions of the second acknowledgment message 720 (e.g., PDAN message 720) from the wireless device 104$_2$ (see FIG. 7's step 12 for additional details). The second acknowledgment message 720 comprises: a second bitmap indicating receipt of the data blocks 702$_1$, 702$_2$ . . . 702$_x$ by the wireless device 104$_2$. The number of repetitions of the second acknowledgment message 720 is based on the UL coverage class. The other RAN node 102$_1$ can also be configured in a similar manner to perform method 800.

Figure 9:
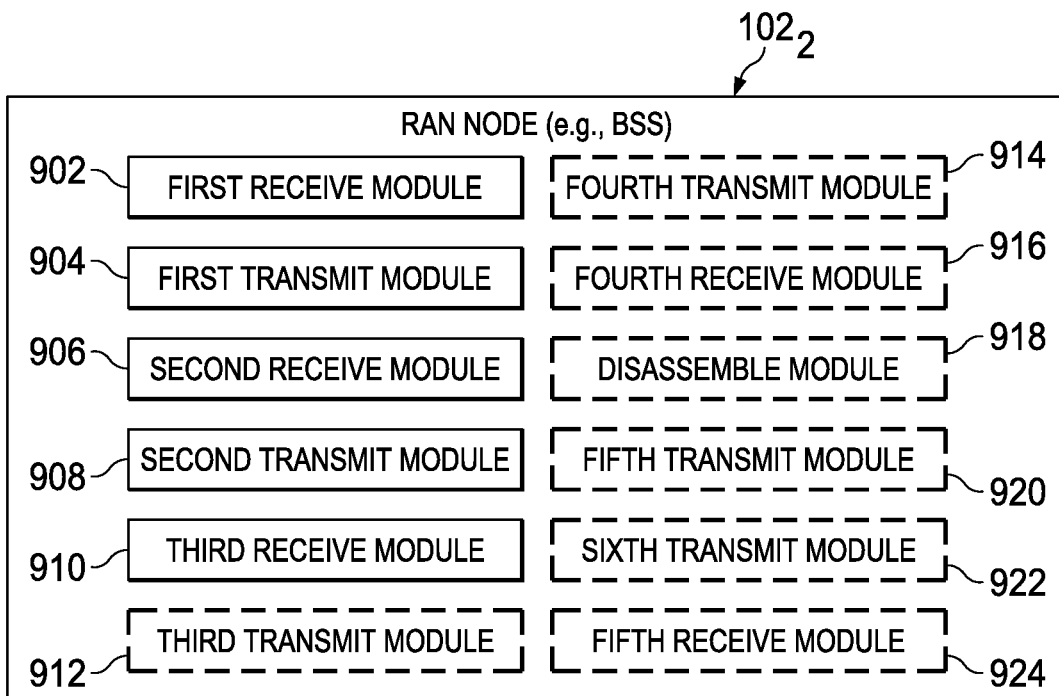
FIG. 9 is a block diagram illustrating an exemplary structure of the RAN node shown in FIG. 7 in accordance with an embodiment of the present disclosure.

Referring to FIG. 9, there is a block diagram illustrating structures of an exemplary RAN node 102$_2$ (for example) configured in accordance with an embodiment of the present disclosure. In one embodiment, the RAN node 102$_2$ may comprise a first receive module 902, a first transmit module 904, a second receive module 906, a second transmit module 908, a third receive module 910, a third transmit module 912, a fourth transmit module 914, a fourth receive module 916, a disassemble module 918, a fifth transmit module 920, a sixth transmit module 922, and a fifth receive module 924. The RAN node 102$_2$ may also include other components, modules or structures which are well-known, but for clarity, only the components, modules or structures needed to describe the features of the present disclosure are described herein.

The first receive module 902 can be configured to receive the paging request message 704 from the CN node 107. The paging request message 704 is associated with the wireless device 104$_2$ (for example) (see FIG. 7's step 1 for additional details).

The first transmit module 904 can be configured to transmit one or more repetitions of the page message 706 to the wireless device 104$_2$ (see FIG. 7's step 2 for additional details). The number of repetitions ($N_{TX,\ DL}$) of the page message 706 is based on the DL coverage class.

The second receive module 906 can be configured to receive one or more repetitions of the access request message 708 from the wireless device 104$_2$ (see FIG. 7's step 3 for additional details). The access request message 708 requests resources for sending a Page Response message 712 and includes an indication ($N_{TX,\ DL}$) of a DL coverage class. The number of repetitions ($N_{TX,\ UL}$) of the access request message 708 is based on the UL coverage class.

The second transmit module 908 can be configured to transmit one or more repetitions of the uplink assignment message 712 to the wireless device 104$_2$ (see FIG. 7's step 4 for additional details). The uplink assignment message 712 can comprise: (a) an indication of a number of pre-allocated radio block(s) on a packet data traffic channel; (b) an indication ($N_{TX,\ UL}$) of an UL coverage class; (c) an indication ($N_{TX,\ DL}$) of a DL coverage class; and (d) an indication of when the wireless device 104$_2$ is to start looking for a first data block 702$_1$ (for example) from the RAN node 102$_2$. The number of repetitions of the uplink assignment message 712 is based on the DL coverage class.

The third receive module 910 can be configured to receive one or more repetitions of the page response message 712 from the wireless device 104$_2$ (see FIG. 7's step 5 for additional details). The page response message 712 can comprise: uplink payload (e.g., a dummy LLC PDU), where the uplink payload is received in the pre-allocated radio block(s). The page response message 712 is repeated according to the UL coverage class.

The third transmit module 912 can be configured to transmit one or more repetitions of the first acknowledgment message 714 (e.g., PUAN message 714) to the wireless device $104_2$ (see FIG. 7's step 6 for additional details). The first acknowledgment message 714 can comprise: a first bitmap indicating receipt of the page response message 712 by the RAN node $102_2$ and a Final Ack Indicator (FAI) indicating completion of the uplink transmission. The number of repetitions of the first acknowledgment message 714 is based on the DL coverage class.

The fourth transmit module 914 can be configured to transmit the paging response message 713 to the CN node 107 (see FIG. 7's step 7 for additional details).

The fourth receive module 916 can be configured to receive a PDU including the downlink payload 716 from the CN node 107 (see FIG. 7's step 8 for additional details).

The disassemble module 918 can be configured to disassemble the PDU including the downlink payload 716 into one or more data blocks $702_1, 702_2 \ldots 702_x$ appropriate for transmission to the wireless device 1042 over the radio interface (see FIG. 7's step 9 for additional details).

The fifth transmit module 920 can be configured to transmit one or more repetitions of the downlink assignment message 718 to the wireless device $104_2$ (see FIG. 7's step 10 for additional details). The downlink assignment message 718 can comprise: (a) an indication of assigned DL resources on the packet data traffic channel; (b) an indication ($N_{TX, DL}$) of a DL coverage class; and (c) an indication of when the wireless device $104_2$ is to start looking for a first data block $702_1$ (for example) from the RAN node $102_2$. The number of repetitions of the downlink assignment message 718 is based on the DL coverage class.

The sixth transmit module 922 can be configured to transmit to the wireless device $104_2$ one or more repetitions of each of the data blocks $702_1, 702_2 \ldots 702_x$ using the assigned DL resources (see FIG. 7's step 11 for additional details). The number of repetitions of each of the data blocks $702_1, 702_2 \ldots 702_x$ is based on the DL coverage class. Further, all repetitions of each of the data blocks $702_1, 702_2 \ldots 702_x$ are transmitted contiguously to the wireless device $104_2$, and each of the data blocks $702_1, 702_2 \ldots 702_x$ does not need to be transmitted contiguously with respect to one another to the wireless device $104_2$.

The fifth receive module 924 can be configured to receive one or more repetitions of the second acknowledgment message 720 (e.g., PDAN message 720) from the wireless device $104_2$ (see FIG. 7's step 12 for additional details). The second acknowledgment message 720 comprises: a second bitmap indicating receipt of the data blocks $702_1, 702_2 \ldots 702_x$ by the wireless device $104_2$. The number of repetitions of the second acknowledgment message 720 is based on the UL coverage class. The other RAN node $102_1$ can also be configured in a similar manner to perform method 800.

As those skilled in the art will appreciate, the above-described modules 902, 904, 906, 908, 910, 912, 914, 916, 918, 920, 922 and 924 of the RAN node $102_2$ (e.g., BSS $102_2$) may be implemented separately as suitable dedicated circuits. Further, the modules 902, 904, 906, 908, 910, 912, 914, 916, 918, 920, 922 and 924 can also be implemented using any number of dedicated circuits through functional combination or separation. In some embodiments, the modules 902, 904, 906, 908, 910, 912, 914, 916, 918, 920, 922 and 924 may be even combined in a single application specific integrated circuit (ASIC). As an alternative software-based implementation, the RAN node $102_2$ (e.g., BSS $102_2$) may comprise a memory $134_2$, a processor $132_2$ (including but not limited to a microprocessor, a microcontroller or a Digital Signal Processor (DSP), etc.) and a transceiver $122_2$. The memory $134_2$ stores machine-readable program code executable by the processor $132_2$ to cause the RAN node $102_2$ (e.g., BSS $102_2$) to perform the steps of the above-described method 800. It should be appreciated that the other RAN node $102_1$ can also be configured in a similar manner as the RAN node $102_2$ to perform method 800.

Figure 10:
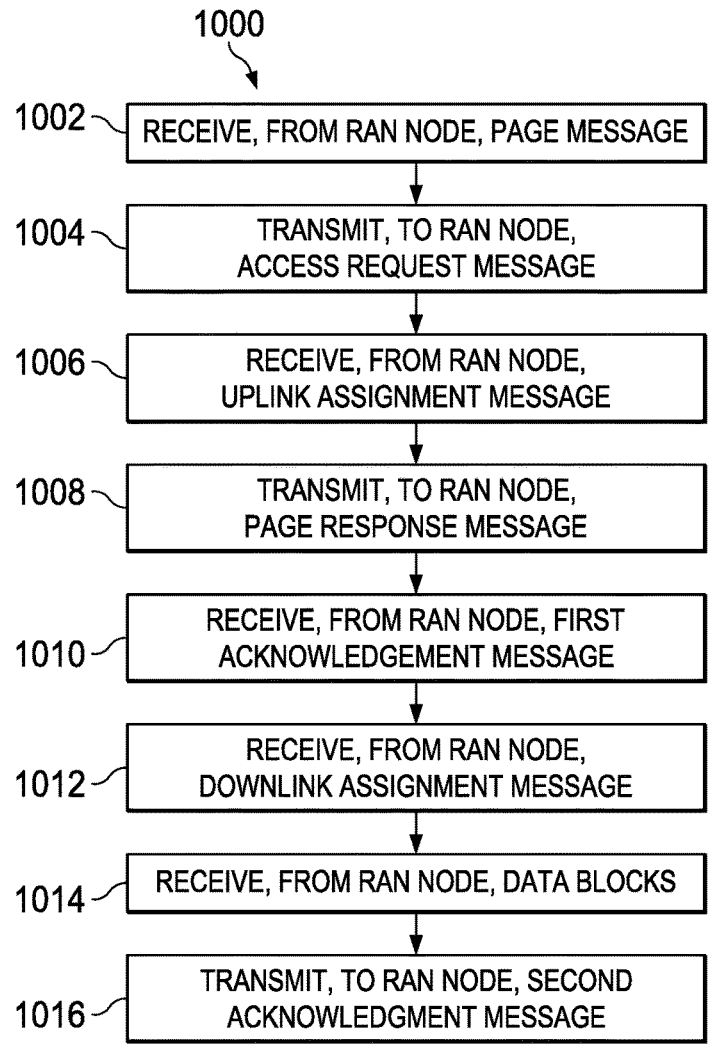
FIG. 10 is a flowchart of a method implemented in the wireless device shown in FIG. 7 in accordance with an embodiment of the present disclosure.

Referring to FIG. 10, there is a flowchart of a method 1000 implemented in a wireless device $104_2$ (for example) in accordance with an embodiment of the present disclosure. At step 1002, the wireless device $104_2$ receives one or more repetitions of the page message 706 from the RAN node $102_2$ (see FIG. 7's step 2 for additional details). The number of repetitions of the page message 706 is based on the DL coverage class $N_{TX, DL}$.

At step 1004, the wireless device $104_2$ transmits one or more repetitions of the access request message 708 to the RAN node $102_2$ (see FIG. 7's step 3 for additional details). The access request message 708 requests resources for sending a Page Response message 712 and includes an indication ($N_{TX, DL}$) of a DL coverage class. The number of repetitions of the access request message 708 is based on the UL coverage class.

At step 1006, the wireless device $104_2$ receives one or more repetitions of the uplink assignment message 710 from the RAN node $102_2$ (see FIG. 7's step 4 for additional details). The uplink assignment message 710 can comprise: (a) an indication of a number of pre-allocated radio block(s) on a packet data traffic channel; (b) an indication ($N_{TX, UL}$) of an UL coverage class; (c) an indication ($N_{TX, DL}$) of a DL coverage class; and (d) an indication of a starting point of the pre-allocated radio blocks that the wireless device $104_2$ is to use to transmit the page response message 712 to the RAN node $102_2$. The number of repetitions of the uplink assignment message 710 is based on the DL coverage class.

At step 1008, the wireless device $104_2$ transmits one or more repetitions of the page response message 712 to the RAN node $102_2$ (see FIG. 7's step 5 for additional details). The page response message 712 can comprise: uplink payload (e.g., a dummy LLC PDU), where the uplink payload is transmitted in the pre-allocated radio block(s). The page response message 712 is repeated according to the UL coverage class.

At step 1010, the wireless device $104_2$ receives one or more repetitions of the first acknowledgment message 714 (e.g., PUAN message 714) from the RAN node $102_2$ (see FIG. 7's step 6 for additional details). The first acknowledgment message 714 can comprise: a first bitmap indicating receipt of the page response message 712 by the RAN node $102_2$. The number of repetitions of the first acknowledgment message 714 is based on the DL coverage class.

At step 1012, the wireless device $104_2$ receives one or more repetitions of the downlink assignment message 718 from the RAN node $102_2$ (see FIG. 7's step 10 for additional details). The downlink assignment message 718 can comprise: (a) an indication of assigned DL resources on the packet data traffic channel; (b) an indication ($N_{TX, DL}$) of a DL coverage class; and (c) an indication of when the wireless device $104_2$ is to start looking for a first data block $702_1$ (for example) from the RAN node $102_2$. The number of repetitions of the downlink assignment message 718 is based on the DL coverage class.

At step 1014, the wireless device $104_2$ receives from the RAN node $102_2$ one or more repetitions of each of the data blocks $702_1, 702_2 \ldots 702_x$ using the assigned DL resources (see FIG. 7's step 11 for additional details). The number of repetitions of each of the data blocks $702_1, 702_2 \ldots 702_x$ is based on the DL coverage class. Further, all repetitions of each of the data blocks $702_1, 702_2 \ldots 702_x$ are received contiguously by the wireless device $104_2$, and each of the data blocks $702_1, 702_2 \ldots 702_x$ does not need to be received contiguously with respect to one another at the wireless device $104_2$.

At step 1016, the wireless device $104_2$ transmits one or more repetitions of the second acknowledgment message 720 (e.g., PDAN message 720) to the RAN node $102_2$ (see FIG. 7's step 12 for additional details). The second acknowledgment message 720 comprises: a second bitmap indicating receipt of the data blocks $702_1, 702_2 \ldots 702_x$ by the wireless device $104_2$. The number of repetitions of the second acknowledgment message 720 is based on the UL coverage class. The other wireless devices $104_1, 104_3 \ldots 104_n$ can also be configured in a similar manner to perform method 1000.

Figure 11:
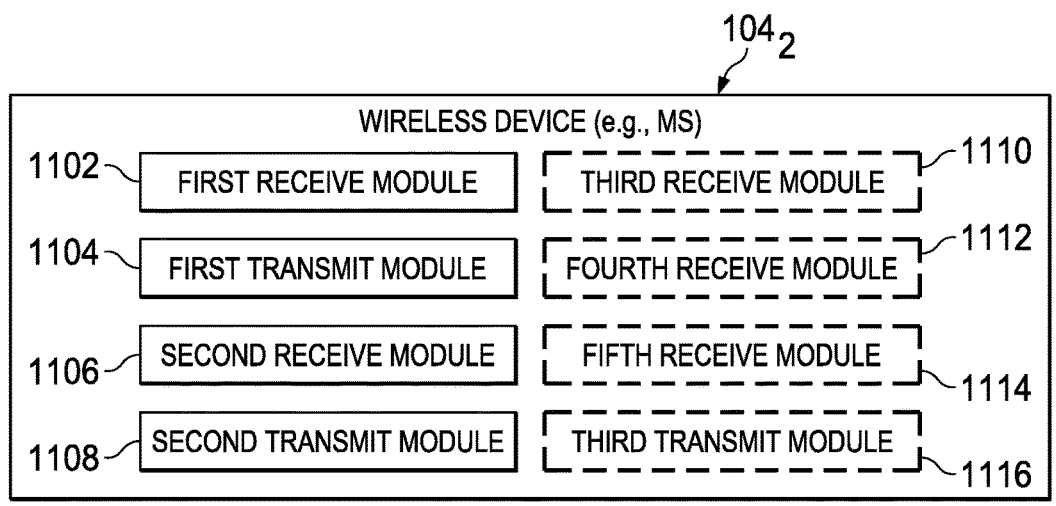
FIG. 11 is a block diagram illustrating an exemplary structure of the wireless device shown in FIG. 7 in accordance with an embodiment of the present disclosure.

Referring to FIG. 11, there is a block diagram illustrating structures of an exemplary wireless device $104_2$ (for example) configured in accordance with an embodiment of the present disclosure. In one embodiment, the wireless device $104_2$ may comprise a first receive module 1102, a first transmit module 1104, a second receive module 1106, a second transmit module 1108, a third receive module 1110, a fourth receive module 1112, a fifth receive module 114, and a third transmit module 1116. The wireless device $104_2$ may also include other components, modules or structures which are well-known, but for clarity, only the components, modules or structures needed to describe the features of the present disclosure are described herein.

The first receive module 1102 can be configured to receive one or more repetitions of the page message 706 from the RAN node $102_2$ (see FIG. 7's step 2 for additional details). The number of repetitions of the page message 706 is based on the DL coverage class.

The first transmit module 1104 can be configured to transmit one or more repetitions of the access request message 708 to the RAN node $102_2$ (see FIG. 7's step 3 for additional details). The access request message 708 requests resources for sending a Page Response message 712 and includes an indication ($N_{TX, DL}$) of a DL coverage class. The number of repetitions of the access request message 708 is based on the UL coverage class.

The second receive module 1106 can be configured to receive one or more repetitions of the uplink assignment message 710 from the RAN node $102_2$ (see FIG. 7's step 4 for additional details). The uplink assignment message 710 can comprise: (a) an indication of a number of pre-allocated radio block(s) on a packet data traffic channel; (b) an indication ($N_{TX, UL}$) of an UL coverage class; (c) an indication ($N_{TX, DL}$) of a DL coverage class; and (d) an indication of a starting point of the pre-allocated radio blocks that the wireless device $104_2$ is to use to transmit the page response message 712 to the RAN node $102_2$. The number of repetitions of the uplink assignment message 710 is based on the DL coverage class.

The second transmit module 1108 can be configured to transmit one or more repetitions of the page response message 712 to the RAN node $102_2$ (see FIG. 7's step 5 for additional details). The page response message 712 can comprise: uplink payload (e.g., a dummy LLC PDU), where the uplink payload is transmitted in the pre-allocated radio block(s). The page response message 712 is repeated according to the UL coverage class.

The third receive module 1110 can be configured to receive one or more repetitions of the first acknowledgment message 714 (e.g., PUAN message 714) from the RAN node $102_2$ (see FIG. 7's step 6 for additional details). The first acknowledgment message 714 can comprise: a first bitmap indicating receipt of the page response message 712 by the RAN node $102_2$. The number of repetitions of the first acknowledgment message 714 is based on the DL coverage class.

The fourth receive module 1112 can be configured to receive one or more repetitions of the downlink assignment message 718 from the RAN node $102_2$ (see FIG. 7's step 10 for additional details). The downlink assignment message 718 can comprise: (a) an indication of assigned DL resources on the packet data traffic channel; (b) an indication ($N_{TX, DL}$) of a DL coverage class; and (c) an indication of when the wireless device $104_2$ is to start looking for a first data block $702_1$ (for example) from the RAN node $102_2$. The number of repetitions of the downlink assignment message 718 is based on the DL coverage class.

The fifth receive module 1114 can be configured to receive from the RAN node $102_2$ one or more repetitions of each of the data blocks $702_1, 702_2 \ldots 702_x$ using the assigned DL resources (see FIG. 7's step 11 for additional details). The number of repetitions of each of the data blocks $702_1, 702_2 \ldots 702_x$ is based on the DL coverage class. Further, all repetitions of each of the data blocks $702_1, 702_2 \ldots 702_x$ are received contiguously by the wireless device $104_2$, and each of the data blocks $702_1, 702_2 \ldots 702_x$ does not need to be received contiguously with respect to one another at the wireless device $104_2$.

The third transmit module 1116 can be configured to transmit one or more repetitions of the second acknowledgment message 720 (e.g., PDAN message 720) to the RAN node $102_2$ (see FIG. 7's step 12 for additional details). The second acknowledgment message 720 comprises: a second bitmap indicating receipt of the data blocks $702_1, 702_2 \ldots 702_x$ by the wireless device $104_2$. The number of repetitions of the second acknowledgment message 720 is based on the UL coverage class. The other wireless devices $104_1, 104_3 \ldots 104_n$ can also be configured in a similar manner to perform method 1000.

As those skilled in the art will appreciate, the above-described modules 1102, 1104, 1106, 1108, 1110, 1112, 1114, and 1116 of the wireless device $104_2$ (e.g., MS $104_2$) may be implemented separately as suitable dedicated circuits. Further, the modules 1102, 1104, 1106, 1108, 1110, 1112, 1114, and 1116 can also be implemented using any number of dedicated circuits through functional combination or separation. In some embodiments, the modules 1102, 1104, 1106, 1108, 1110, 1112, 1114, and 1116 may be even combined in a single application specific integrated circuit (ASIC). As an alternative software-based implementation, the wireless device $104_2$ may comprise a memory $120_2$, a processor $118_2$ (including but not limited to a microprocessor, a microcontroller or a Digital Signal Processor (DSP), etc.) and a transceiver $110_2$. The memory $120_2$ stores machine-readable program code executable by the processor $118_2$ to cause the wireless device $104_2$ to perform the steps of the above-described method 1000. It should be appreciated that the other wireless devices $104_1, 104_3 \ldots 104_n$ can also be configured in a similar manner as the wireless device $104_2$ to perform method 1000.

Figure 12:
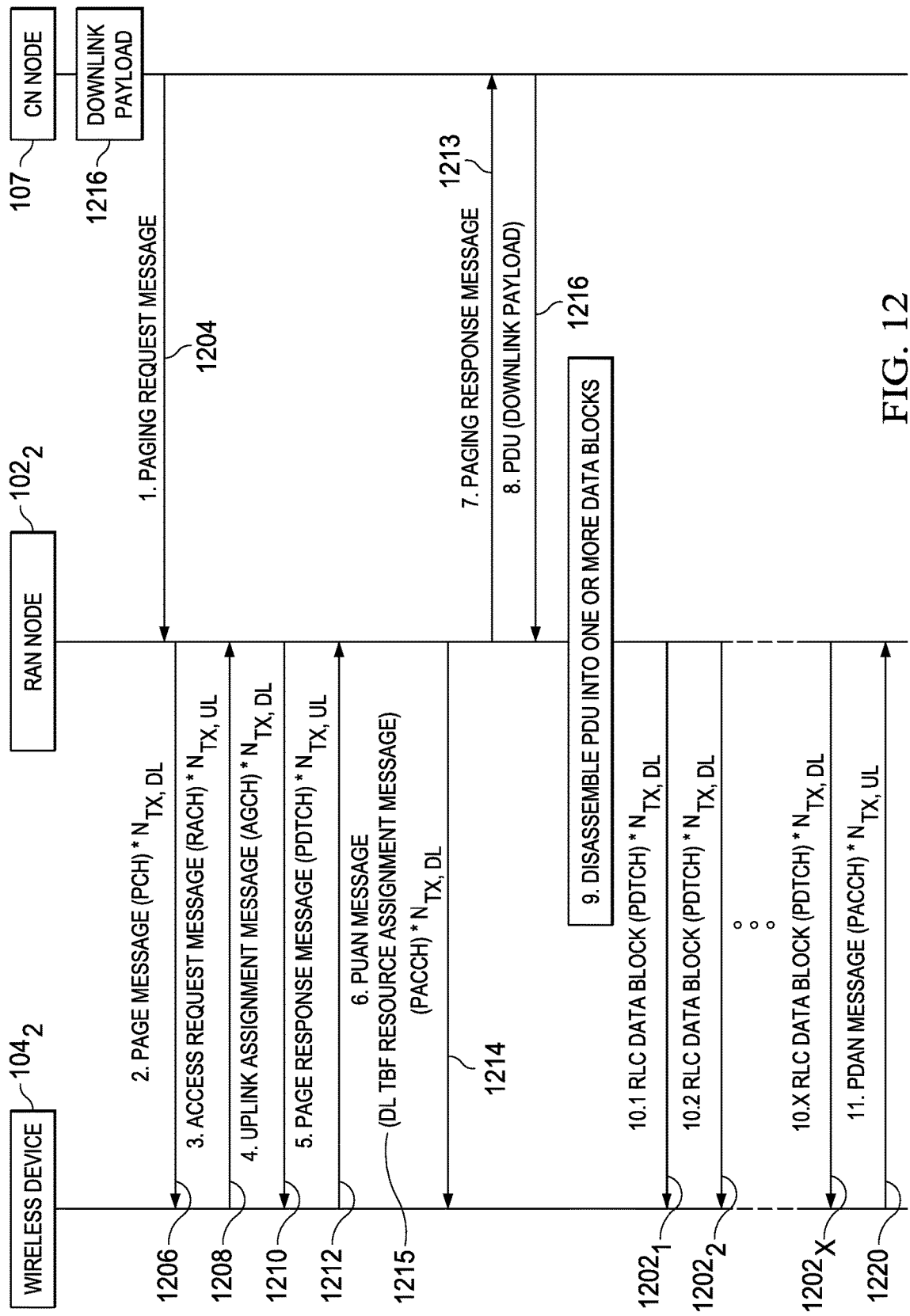
FIG. 12 is a signal flow diagram illustrating the signaling associated with a wireless device receiving a downlink small data transmission from a RAN node utilizing a flexible downlink allocation technique in accordance with an embodiment of the present disclosure.

Another exemplary sequence of signaling steps associated with the FDA technique is illustrated in FIG. 12 and described in detail below with respect to another scenario where the RAN node $102_2$ has small data transmissions to transmit to the wireless device $104_2$ (e.g., IoT device $104_2$) which has an uplink coverage class needing $N_{TX, UL}$ repetitions, and a downlink coverage class needing $N_{TX, DL}$ repetitions. The exemplary signaling steps associated with the wireless device $104_2$ receiving small data transmissions from the RAN node $102_2$ are as follows:

Step 1:

The CN node 107 (e.g., SGSN 107) receives some downlink payload 1216 (e.g., an IP packet) for the wireless device $104_2$ and acts on the payload 1216 by transmitting to the RAN node $102_2$ (e.g., BSS $102_2$) a Paging Request message 1204 indicating the International Mobile Subscriber Identity (IMSI), the extended discontinuous receive (eDRX) cycle length, and the $N_{TX, DL}$ of the wireless device $104_2$, where the indicated $N_{TX, DL}$ is based on the DL coverage class last indicated by the wireless device $104_2$ (e.g., within a Routing Area Update (RAU) Request message).

Step 2:

The RAN node $102_2$ (e.g., BSS $102_2$) transmits one or more repetitions of a Page message 1206 on the EC-Paging Channel (PCH) to the wireless device $104_2$ using the nominal paging group of the wireless device $104_2$. The RAN node $102_2$ (e.g., BSS $102_2$) can determine the nominal paging group of the wireless device $104_2$ using the IMSI, the eDRX cycle length, the number of EC-PCH blocks per 51-multiframe, and the $N_{TX, DL}$ of the wireless device $104_2$ as follows:

Each eDRX cycle consists of Y 51-multiframes subject to the restriction that each eDRX cycle needs to occur an integral number of times within the overall Time Division Multiple Access (TDMA) Frame Number (FN) space.

The number of paging groups per eDRX cycle is determined on a coverage class basis, where the RAN node $102_2$ (e.g., BSS $102_2$) first determines the nominal paging group of the wireless device $104_2$ assuming $N_{TX, DL}=1$, which effectively determines a window of four 51-multiframes in which the wireless device $104_2$ will wake-up to attempt to read according to its actual nominal paging group.

The specific EC-PCH blocks that the wireless device $104_2$ considers to be its nominal paging group within the four 51-multiframe window is determined based on the DL coverage class last indicated by the wireless device $104_2$.

Step 3:

The wireless device $104_2$ transmits one or more repetitions of an access request message 1208 on the EC-RACH to the RAN node $102_2$ (e.g., BSS $102_2$). The access request message 1208 is requesting resources for sending a Page Response message 1212 (see step 5). The number of repetitions used to transmit the access request message 1208 is based on the wireless device $104_2$'s estimated UL coverage class $N_{TX, UL}$ (a single repetition is always used by the wireless device $104_2$ when in normal coverage). The access request message 1208 can be configured as follows The information the wireless device $104_2$ can include within the access request message 1208 is indicated by TABLE #2 and discussed in more detail next:

An indication of whether or not the wireless device $104_2$ supports MCS-5 through MCS-9 is indicted by the TSC used when transmitting the access request message 1208 as per legacy operation.

The access request message 1208 that is transmitted on the EC-RACH includes an indication of the DL coverage class estimated by the wireless device $104_2$.

System Information (SI) sent on TS1 indicates that if a wireless device $104_2$ (for example) is in normal coverage ($N_{TX, UL}=N_{TX, DL}=1$) then it is to perform a system access using the RACH of TS0 or the RACH of TS1. Note: the System Information could be transmitted by the RAN node $102_2$ before the RAN node $102_2$ transmits the Page message 1206.

TABLE #3

| Content of Access Request Message 1208 | | | | | |
|---|---|---|---|---|---|
| Type of Access | Number of MCS-1 Coded | Spare Bit | Random Bits | DL Coverage | Device Identity |
| AB on TS0 | Yes (0000 = page response) | Yes | Yes | No[1] | No |
| AB on TS1 | Yes (0000 = page response) | Yes | Yes | Yes | No |
| NB on TS0 | Yes | No | No | No[1] | Yes |
| NB on TS1 | Yes | No | No | Yes | Yes |

NOTE[1]
Not needed since the access is always when in normal coverage on UL and DL Step 4:

The RAN node $102_2$ (e.g., BSS $102_2$) transmits one or more repetitions of an Uplink Assignment message 1210 on the EC-AGCH to the wireless device $104_2$. The number of repetitions used by RAN node $102_2$ (e.g., BSS $102_2$) when transmitting the Uplink Assignment message 1210 is indicated by the $N_{TX, DL}$ value included in the Page Response Request message 1208. The Uplink Assignment message 1210 includes the same assignment information as per the Uplink Assignment message 206 as described above with respect to FIG. 2's Step 2 of the Fixed Uplink Allocation technique but for the case where X=1.

Step 5:

Similar to FIG. 2's Step 3 of the Fixed Uplink Allocation technique, a HARQ scheme is used by the wireless device $104_2$ for transmitting to the RAN node $102_2$ the uplink payload (e.g., a Page Response 1212 consisting of a dummy LLC PDU) using the $N_{TX, UL}$ pre-allocated UL radio blocks, wherein, after transmitting the uplink payload (Page Response 1212) the wireless device $104_2$ waits for a corresponding PUAN message 1214.

Step 6:

The RAN node $102_2$ (e.g., BSS $102_2$) transmits the PUAN message 1214 to the wireless device $104_2$ after attempting to receive the $N_{TX, UL}$ pre-allocated UL radio blocks (Page Response 1212) from the wireless device $104_2$. After transmitting the Page Response 1212, the wireless device $104_2$ attempts to receive the PUAN message 1214 starting within the first possible set of EC-PACCH blocks corresponding to the wireless device $104_2$'s assigned DL coverage class, as per FIG. 2's Step 4 of the Fixed Uplink Allocation technique and discussed next:

The PUAN message 1214 includes a DL TBF resource assignment message 1215, providing assigned DL EC-PDTCH resources (e.g., timeslots) and an indication where the wireless device $104_2$ is to start looking for RLC data blocks $1202_1$, $1202_2$, $1202_3$ ... $1202_x$ thereon according to a DRX cycle after first waiting a certain time period (e.g., as indicated by the information within the PUAN message 1214). This technique will save the wireless device $104_2$ from having to receive an additional EC-AGCH message 718 as shown in FIG. 7.

Step 7:

The RAN node $102_2$ (e.g., BSS $102_2$) relays a Paging Response message 1213 (e.g., a dummy LLC PDU) to the CN node 107 (e.g., SGSN 107).

Step 8:

The CN node 107 (e.g., SGSN 107) transmits a PDU including the pending downlink user plane payload 1216 to the RAN node $102_2$ (e.g., BSS $102_2$) from which the CN node 107 (e.g., SGSN 107) received the Paging Response message 1213.

Step 9:

The RAN node $102_2$ (e.g., BSS $102_2$) disassembles the PDU including the pending downlink user plane payload 1216 into one or more RLC data blocks $1202_1$, $1202_2$, $1202_3$ ... $1202_x$ appropriate for transmitting to the wireless device $104_2$ over the radio interface.

Step 10:

A HARQ scheme is used by the RAN node $102_2$ (e.g., BSS $102_2$) for transmitting the downlink payload 1216 (RLC data blocks $1202_1$, $1202_2$, $1202_3$ ... $1202_x$) to the wireless device $104_2$. The wireless device $104_2$ may be polled for a PDAN message 1220 within one or more of the variable number of RLC data blocks $1202_1$, $1202_2$, $1202_3$ ... $1202_x$ transmitted to the wireless device $104_2$ prior to the point in time where the PDAN message 1220 is to be transmitted. The following is a discussion about how the wireless device $104_2$ can function to receive the RLC data blocks $1202_1$, $1202_2$, $1202_3$ ... $1202_x$:

- When attempting to find a DL RLC data block $1202_1$ (for example), the wireless device $104_2$ examines fixed sets of EC-PDTCH blocks based on the wireless device $104_2$'s coverage class. For example, if the wireless device $104_2$ uses $N_{TX, DL}=2$ (i.e., 2 blind repetitions) then it will only look at fixed pairs of EC-PDTCH blocks in an attempt to receive a RLC data block $1202_1$ (for example) addressed to the wireless device $104_2$'s assigned TFI on the wireless device $104_2$'s assigned timeslots. As such, the wireless device $104_2$ will view each 52-multiframe on a monitored TS as potentially containing 6 pairs of EC-PDTCH blocks, where any one of these pairs may potentially contain an expected RLC data block $1202_1$.
- If the RLC data block $1202_1$ is not received within a set of applicable EC-PDTCH blocks, then the wireless device $104_2$ continues to read additional sets of EC-PDTCH blocks applicable to the wireless device $104_2$'s downlink coverage class.
- For example, if the downlink payload 1216 transmission consists of 5 MCS-1 RLC data blocks (X=5) and the $N_{TX, DL}$ indicates 8 repetitions are needed, then a total of 40 radio blocks (X*$N_{TX, DL}$) need to be transmitted. These 40 radio blocks will be transmitted using 5 instances of 8 contiguous radio blocks over the set of assigned timeslots. The time period between the transmissions of any two successive RLC data blocks (i.e., between instances of 8 contiguous radio blocks) is variable, although the DL TBF resource assignment message 1215 may optionally indicate what this time period is in the interest of the wireless device $104_2$'s battery conservation.
- The polling may be performed by including a polling field within a set of one or more RLC data blocks $1202_1$, $1202_2$, $1202_3$ ... $1202_x$, where the polling field in each RLC data block $1202_1$, $1202_2$, $1202_3$ ... $1202_x$ indicates the same point in time at which the wireless device $104_2$ is to transmit a PDAN message 1220 on the UL EC-PACCH to the RAN node $102_2$ (e.g., BSS $102_2$).

Step 11:

The PDAN message 1220 is transmitted by the wireless device $104_2$ on the UL EC-PACCH to the RAN node $102_2$ (e.g., BSS $102_2$), wherein the location of the first pre-allocated UL EC-PACCH block used to transmit the PDAN message 1220 is indicated by the polling information included in one or more of the RLC data blocks $1202_1$, $1202_2$, $1202_3$ ... $1202_x$ transmitted to the wireless device $104_2$. The following is a more detailed discussion about the transmission and reception of the PDAN message 1220:

- The location of the first UL EC-PACCH block used to transmit the PDAN message 1220 may be expressed as an offset relative to DL RLC data block $1202_1$ (for example) from which the polling information was read.
- Alternatively, if the downlink assignment information indicates that a specific number of DL RLC data blocks $1202_1$, $1202_2$, $1202_3$ ... $1202_x$ will be transmitted contiguously prior to polling, then upon receiving the last DL radio block $1202_x$ used to convey the DL RLC data blocks $1202_1$, $1202_2$, $1202_3$ ... $1202_x$, the wireless device $104_2$ can transmit the PDAN message 1220 using an offset (e.g., fixed or indicated by the downlink assignment message 1215) from the last DL radio block $1202_x$, to determine where to start transmitting the PDAN message 1220. This same principle can be used where the wireless device $104_2$ has sent a PDAN message 1220 indicating that one or more DL RLC data blocks $1202_2$ (for example) need to be resent (i.e., the wireless device $104_2$ will expect all resent DL RC data blocks $1202_2$ (for example) to be transmitted contiguously and thereby determine where to transmit the corresponding PDAN message 1220).
- $N_{TX, UL}$ contiguous radio blocks are pre-allocated for transmission of the PDAN message 1220.
- If the RAN node $102_2$ (e.g., BSS $102_2$) does not receive the PDAN message 1220 within the pre-allocated UL radio blocks, then the RAN node $102_2$ (e.g., BSS $102_2$) may resend a DL RLC data block $1202_1$ (for example) including polling information (a repeated poll).
- As such, after the wireless device $104_2$ receives a DL RLC data block $1202x$ (for example) including polling information and transmits the corresponding PDAN message indicating all DL RLC data blocks $1202_1$, $1202_2$, $1202_3$ ... $1202_x$ have been received, the wireless device $104_2$ should wait a limited amount of time (e.g., indicated by the assignment message 1218) and then start looking for the possible reception of a previously received DL RLC data block $1202_1$ (for example) including polling information. This allows for the case where the RAN node $102_2$ does not receive the PDAN message 1220 sent by the wireless device $104_2$ in response to the repeated poll.
- If the wireless device $104_2$ is polled again within this limited time window, the wireless device $104_2$ should transmit another PDAN message 1220 using the specific set of pre-allocated $N_{TX, UL}$ radio blocks as indicated by the repeated poll. Otherwise, the wireless device $104_2$ should release the DL TBF and enter the EC-Idle state.
- When transmitting the PDAN message 1220 indicating that one or more DL RLC data blocks $1202_2$ (for example) have not been received, the wireless device $104_2$ should continue to monitor the assigned DL PDTCH resources for reception of the missing RLC data blocks $1202_2$ (for example) and then proceed, as per Step 10.

Figure 13:
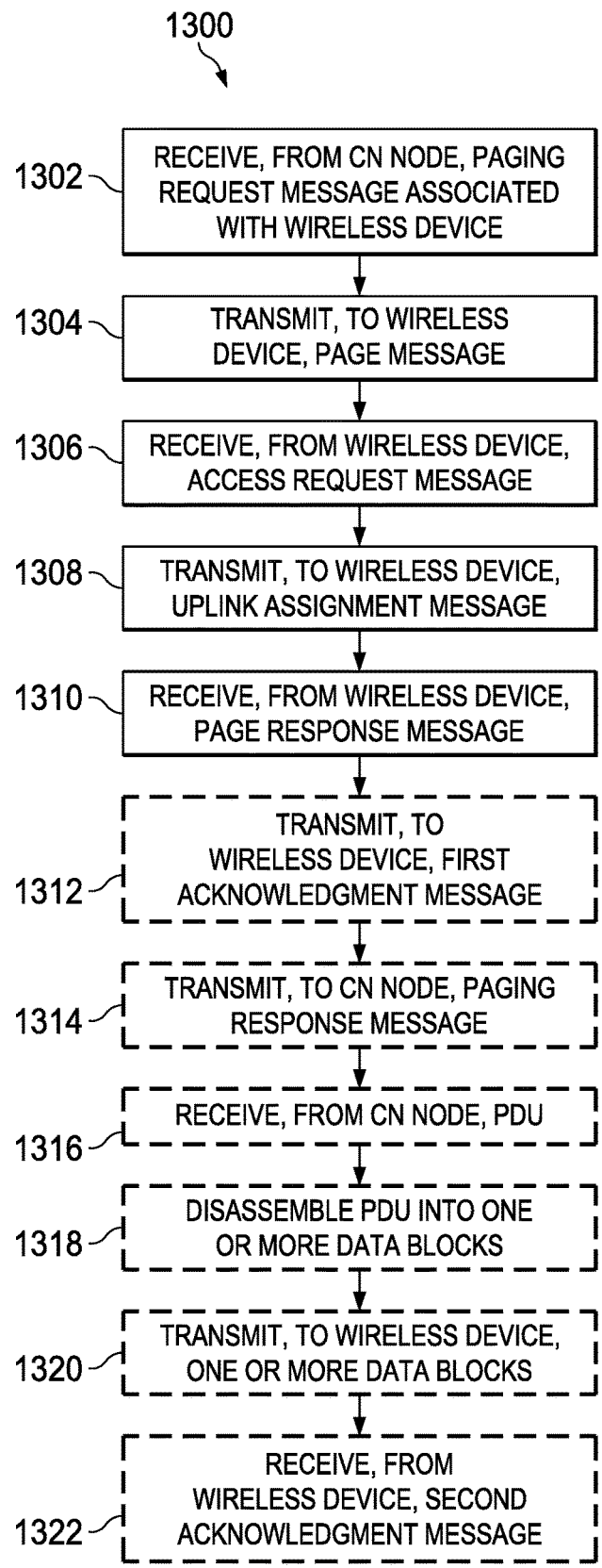
FIG. 13 is a flowchart of a method implemented in the RAN node shown in FIG. 12 in accordance with an embodiment of the present disclosure.

Referring to FIG. 13, there is a flowchart of a method 1300 implemented in a RAN node $102_2$ (for example) in accordance with an embodiment of the present disclosure. At step 1302, the RAN node $102_2$ receives the paging request message 1204 from the CN node 107. The paging request message 1204 is associated with the wireless device 104₂ (for example) (see FIG. 12's step 1 for additional details).

At step 1304, the RAN node 102₂ transmits one or more repetitions of the page message 1206 to the wireless device 104₂ (see FIG. 12's step 2 for additional details). The number of repetitions of the page message 1206 is based on the DL coverage class.

At step 1306, the RAN node 102₂ receives one or more repetitions of the access request message 1208 from the wireless device 104₂ (see FIG. 12's step 3 for additional details). The access request message 1208 requests resources for sending a Page Response message 1212 and includes an indication ($N_{TX, DL}$) of a DL coverage class. The number of repetitions of the access request message 1208 is based on the UL coverage class $N_{TX, UL}$.

At step 1308, the RAN node 102₂ transmits one or more repetitions of the uplink assignment message 1210 to the wireless device 104₂ (see FIG. 12's step 4 for additional details). The uplink assignment message 1210 can comprise: (a) an indication of a number of pre-allocated radio block(s) on a packet data traffic channel; (b) an indication ($N_{TX, UL}$) of an UL coverage class; (c) an indication ($N_{TX, UL}$) of a DL coverage class; and (d) an indication of a starting point of the pre-allocated radio blocks that the wireless device 104₂ is to use to transmit the page response message 1212 to the RAN node 102₂. The number of repetitions of the uplink assignment message 1210 is based on the DL coverage class.

At step 1310, the RAN node 102₂ receives one or more repetitions of the page response message 1212 from the wireless device 104₂ (see FIG. 12's step 5 for additional details). The page response message 1212 can comprise: uplink payload (e.g., a dummy LLC PDU), where the uplink payload is received in the pre-allocated radio block(s). The page response message 1212 is repeated according to the UL coverage class.

At step 1312, the RAN node 102₂ transmits one or more repetitions of the first acknowledgment message 1214 (e.g., PUAN message 1214) to the wireless device 1042 (see FIG. 12's step 6 for additional details). The first acknowledgment message 1214 can comprise: (a) a DL TBF resource assignment message 1215; (b) an indication where the wireless device 104₂ is to start looking for RLC data blocks 1202₁, 1202₂, 1202₃ ... 1202ₓ thereon according to a DRX cycle after first waiting a certain time period (e.g., as indicated by the information within the first acknowledgment message 1214); (c) a first bitmap indicating receipt of the page response message 1212 by the RAN node 102₂, and (d) an indication ($N_{TX, DL}$) of a DL coverage class. The number of repetitions of the first acknowledgment message 1214 is based on the DL coverage class.

At step 1314, the RAN node 102₂ transmits the paging response message 1213 to the CN node 107 (see FIG. 12's step 7 for additional details).

At step 1316, the RAN node 102₂ receives a PDU including the downlink payload 1216 from the CN node 107 (see FIG. 12's step 8 for additional details).

At step 1318, the RAN node 102₂ disassembles the PDU including the downlink payload 1216 into one or more data blocks 1202₁, 1202₂ ... 1202ₓ appropriate for transmission to the wireless device 104₂ over the radio interface (see FIG. 12's step 9 for additional details).

At step 1320, the RAN node 102₂ transmits to the wireless device 104₂ one or more repetitions of each of the data blocks 1202₁, 1202₂ ... 1202ₓ using the assigned DL resources (see FIG. 12's step 10 for additional details). The number of repetitions of each of the data blocks 1202₁, 1202₂ ... 1202ₓ is based on the DL coverage class. Further, all repetitions of each of the data blocks 1202₁, 1202₂ ... 1202ₓ are transmitted contiguously to the wireless device 104₂, and each of the data blocks 1202₁, 1202₂ ... 1202ₓ does not need to be transmitted contiguously with respect to one another to the wireless device 104₂.

At step 1322, the RAN node 102₂ receives one or more repetitions of the second acknowledgment message 1220 (e.g., PDAN message 1220) from the wireless device 104₂ (see FIG. 12's step 11 for additional details). The second acknowledgment message 1220 comprises: a second bitmap indicating receipt of the data blocks 1202₁, 1202₂ ... 1202ₓ by the wireless device 104₂. The number of repetitions of the second acknowledgment message 1220 is based on the UL coverage class. The other RAN node 102₁ can also be configured in a similar manner to perform method 1300.

Figure 14:
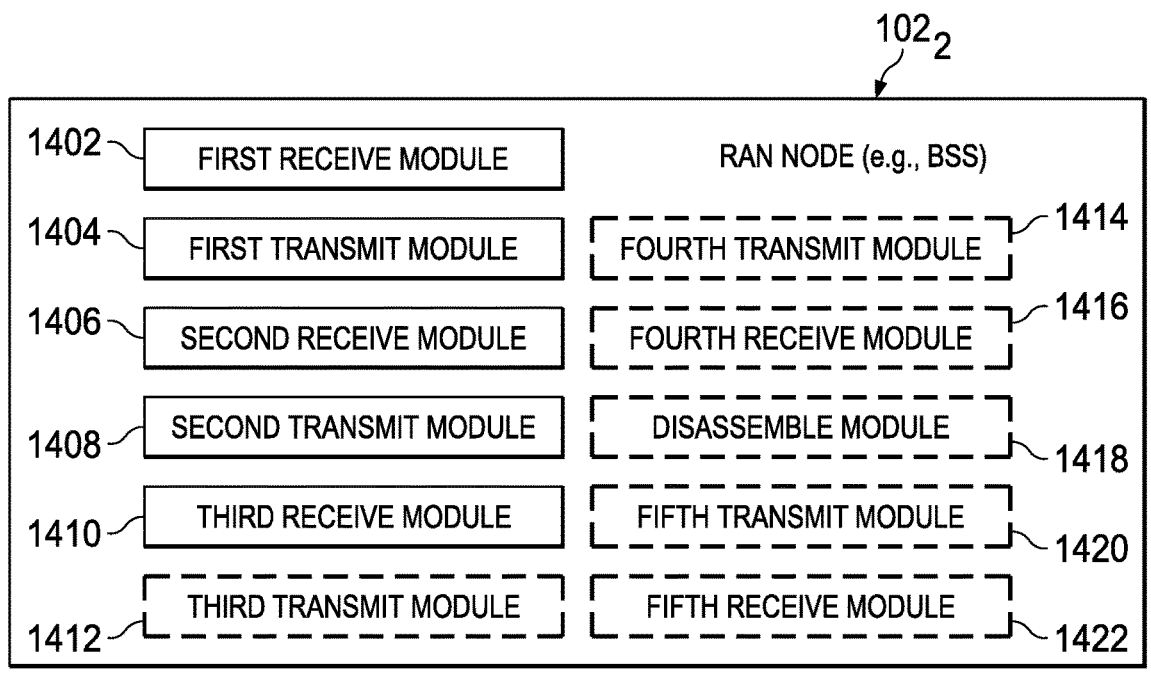
FIG. 14 is a block diagram illustrating an exemplary structure of the RAN node shown in FIG. 12 in accordance with an embodiment of the present disclosure.

Referring to FIG. 14, there is a block diagram illustrating structures of an exemplary RAN node 102₂ (for example) configured in accordance with an embodiment of the present disclosure. In one embodiment, the RAN node 102₂ may comprise a first receive module 1402, a first transmit module 1404, a second receive module 1406, a second transmit module 1408, a third receive module 1410, a third transmit module 1412, a fourth transmit module 1414, a fourth receive module 1416, a disassemble module 1418, a fifth transmit module 1420, and a fifth receive module 1424. The RAN node 102₂ may also include other components, modules or structures which are well-known, but for clarity, only the components, modules or structures needed to describe the features of the present disclosure are described herein.

The first receive module 1402 can be configured to receive the paging request message 1204 from the CN node 107. The paging request message 1204 is associated with the wireless device 104₂ (for example) (see FIG. 12's step 1 for additional details).

The first transmit module 1404 can be configured to transmit one or more repetitions of the page message 1206 to the wireless device 104₂ (see FIG. 12's step 2 for additional details). The number of repetitions of the page message 1206 is based on the DL coverage class.

The second receive module 1406 can be configured to receive one or more repetitions of the access request message 1208 from the wireless device 104₂ (see FIG. 12's step 3 for additional details). The access request message 1208 requests resources for sending a Page Response message 1212 and includes an indication ($N_{TX, DL}$) of a DL coverage class. The number of repetitions of the access request message 1208 is based on the UL coverage class.

The second transmit module 1408 can be configured to transmit one or more repetitions of the uplink assignment message 1210 to the wireless device 104₂ (see FIG. 12's step 4 for additional details). The uplink assignment message 1210 can comprise: (a) an indication of a number of pre-allocated radio block(s) on a packet data traffic channel; (b) an indication ($N_{TX, UL}$) of an UL coverage class; (c) an indication ($N_{TX, DL}$) of a DL coverage class; and (d) an indication of a starting point of the pre-allocated radio blocks that the wireless device 104₂ is to use to transmit the page response message 1212 to the RAN node 102₂. The number of repetitions of the uplink assignment message 1210 is based on the DL coverage class.

The third receive module 1410 can be configured to receive one or more repetitions of the page response message 1212 from the wireless device 104₂ (see FIG. 12's step 5 for additional details). The page response message 1212 can comprise: uplink payload (e.g., a dummy LLC PDU), where the uplink payload is received in the pre-allocated radio block(s). The page response message 1212 is repeated according to the UL coverage class.

The third transmit module 1412 can be configured to transmit one or more repetitions of the first acknowledgment message 1214 (e.g., PUAN message 1214) to the wireless device 104₂ (see FIG. 12's step 6 for additional details). The first acknowledgment message 1214 can comprise: (a) a DL TBF resource assignment message 1215; (b) an indication where the wireless device 104₂ is to start looking for RLC data blocks 1202₁, 1202₂, 1202₃ . . . 1202ₓ thereon according to a DRX cycle after first waiting a certain time period (e.g., as indicated by the information within the first acknowledgment message 1214); (c) a first bitmap indicating receipt of the page response message 1212 by the RAN node 102₂; and (d) an indication ($N_{TX, DL}$) of a DL coverage class. The number of repetitions of the first acknowledgment message 1214 is based on the DL coverage class.

The fourth transmit module 1414 can be configured to transmit the paging response message 1213 to the CN node 107 (see FIG. 12's step 7 for additional details).

The fourth receive module 1416 can be configured to receive a PDU including the downlink payload 1216 from the CN node 107 (see FIG. 12's step 8 for additional details).

The disassemble module 1418 can be configured to disassemble the PDU including the downlink payload 1216 into one or more data blocks 1202₁, 1202₂ . . . 1202ₓ appropriate for transmission to the wireless device 104₂ over the radio interface (see FIG. 12's step 9 for additional details).

The fifth transmit module 1420 can be configured to transmit to the wireless device 104₂ one or more repetitions of each of the data blocks 1202₁, 1202₂ . . . 1202ₓ using the assigned DL resources (see FIG. 12's step 10 for additional details). The number of repetitions of each of the data blocks 1202₁, 1202₂ . . . 1202ₓ is based on the DL coverage class. Further, all repetitions of each of the data blocks 1202₁, 1202₂ . . . 1202ₓ are transmitted contiguously to the wireless device 104₂, and each of the data blocks 1202₁, 1202₂ . . . 1202ₓ does not need to be transmitted contiguously with respect to one another to the wireless device 104₂.

The fifth receive module 1422 can be configured to receive one or more repetitions of the second acknowledgment message 1220 (e.g., PDAN message 1220) from the wireless device 104₂ (see FIG. 12's step 11 for additional details). The second acknowledgment message 1220 comprises: a second bitmap indicating receipt of the data blocks 1202₁, 1202₂ . . . 1202ₓ by the wireless device 104₂. The number of repetitions of the second acknowledgment message 1220 is based on the UL coverage class. The other RAN node 102₁ can also be configured in a similar manner to perform method 1300.

As those skilled in the art will appreciate, the above-described modules 1402, 1404, 1406, 1408, 1410, 1412, 1414, 1416, 1418, 1420, and 1422 of the RAN node 102₂ (e.g., BSS 102₂) may be implemented separately as suitable dedicated circuits. Further, the modules 1402, 1404, 1406, 1408, 1410, 1412, 1414, 1416, 1418, 1420, and 1422 can also be implemented using any number of dedicated circuits through functional combination or separation. In some embodiments, the modules 1402, 1404, 1406, 1408, 1410, 1412, 1414, 1416, 1418, 1420, and 14224 may be even combined in a single application specific integrated circuit (ASIC). As an alternative software-based implementation, the RAN node 102₂ (e.g., BSS 102₂) may comprise a memory 134₂, a processor 132₂ (including but not limited to a microprocessor, a microcontroller or a Digital Signal Processor (DSP), etc.) and a transceiver 122₂. The memory 134₂ stores machine-readable program code executable by the processor 132₂ to cause the RAN node 102₂ (e.g., BSS 102₂) to perform the steps of the above-described method 1300. It should be appreciated that the other RAN node 102₁ can also be configured in a similar manner as the RAN node 102₂ to perform method 1300.

Figure 15:
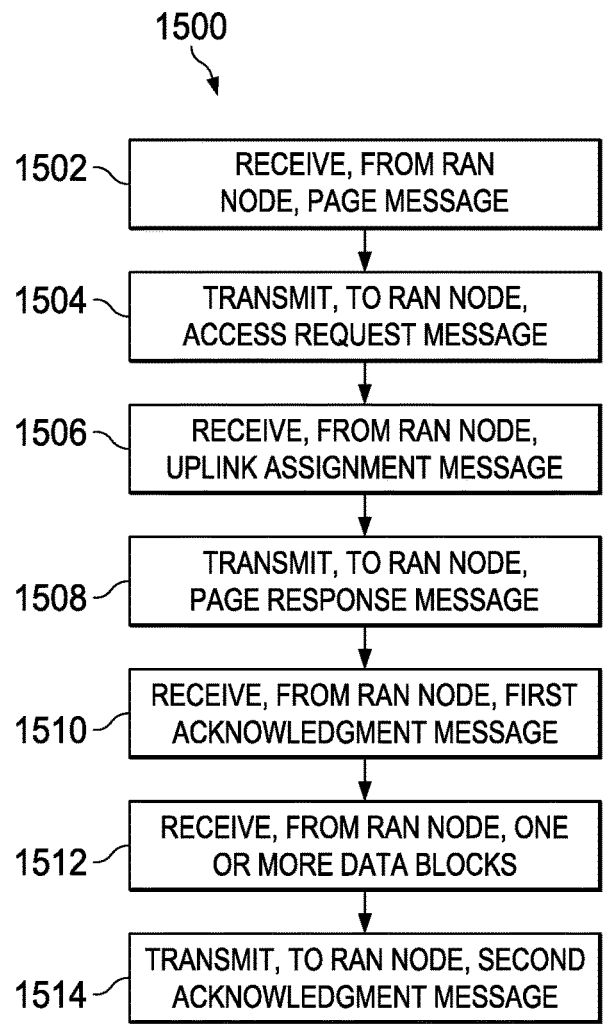
FIG. 15 is a flowchart of a method implemented in the wireless device shown in FIG. 12 in accordance with an embodiment of the present disclosure.

Referring to FIG. 15, there is a flowchart of a method 1500 implemented in a wireless device 104₂ (for example) in accordance with an embodiment of the present disclosure. At step 1502, the wireless device 104₂ receives one or more repetitions of the page message 1206 from the RAN node 102₂ (see FIG. 12's step 2 for additional details). The number of repetitions of the page message 1206 is based on the DL coverage class $N_{TX, DL}$.

At step 1504, the wireless device 104₂ transmits one or more repetitions of the access request message 1208 to the RAN node 102₂ (see FIG. 12's step 3 for additional details). The access request message 1208 requests resources for sending a Page Response message 1212 and includes an indication ($N_{TX, DL}$) of a DL coverage class. The number of repetitions of the access request message 1208 is based on the UL coverage class.

At step 1506, the wireless device 104₂ receives one or more repetitions of the uplink assignment message 1210 from the RAN node 102₂ (see FIG. 12's step 4 for additional details). The uplink assignment message 1210 can comprise: (a) an indication of a number of pre-allocated radio block(s) on a packet data traffic channel; (b) an indication ($N_{TX, UL}$) of an UL coverage class; (c) an indication ($N_{TX, DL}$) of a DL coverage class; and (d) an indication of a starting point of the pre-allocated radio blocks that the wireless device 104₂ is to use to transmit the page response message 1212 to the RAN node 102₂. The number of repetitions of the uplink assignment message 1210 is based on the DL coverage class.

At step 1508, the wireless device 104₂ transmits one or more repetitions of the page response message 1212 to the RAN node 102₂ (see FIG. 12's step 5 for additional details). The page response message 1212 can comprise: uplink payload (e.g., a dummy LLC PDU), where the uplink payload is received in the pre-allocated radio block(s). The page response message 1212 is repeated according to the UL coverage class.

At step 1510, the wireless device 104₂ receives one or more repetitions of the first acknowledgment message 1214 (e.g., PUAN message 1214) from the RAN node 102₂ (see FIG. 12's step 6 for additional details). The first acknowledgment message 1214 can comprise: (a) a DL TBF resource assignment message 1215; (b) an indication where the wireless device 104₂ is to start looking for RLC data blocks 1202₁, 1202₂, 1202₃ . . . 1202ₓ thereon according to a DRX cycle after first waiting a certain time period (e.g., as indicated by the information within the first acknowledgment message 1214); (c) a first bitmap indicating receipt of the page response message 1212 by the RAN node 102₂; and (d) an indication ($N_{TX, DL}$) of a DL coverage class. The number of repetitions of the first acknowledgment message 1214 is based on the DL coverage class.

At step 1512, the wireless device 104₂ receives from the RAN node 102₂ one or more repetitions of each of the data blocks 1202₁, 1202₂ . . . 1202ₓ using the assigned DL resources (see FIG. 12's step 10 for additional details). The number of repetitions of each of the data blocks 1202₁, 1202₂ . . . 1202ₓ is based on the DL coverage class. Further, all repetitions of each of the data blocks 1202₁, 1202₂ . . . 1202ₓ are received contiguously by the wireless device 104₂, and each of the data blocks 1202₁, 1202₂ . . . 1202ₓ does not need to be received contiguously with respect to one another by the wireless device 104₂.

At step 1514, the wireless device 104₂ transmits one or more repetitions of the second acknowledgment message 1220 (e.g., PDAN message 1220) to the RAN node 102₂ (see FIG. 12's step 11 for additional details). The second acknowledgment message 1220 comprises: a second bitmap indicating receipt of the data blocks 1202₁, 1202₂ . . . 1202ₓ by the wireless device 104₂. The number of repetitions of the second acknowledgment message 1220 is based on the UL coverage class. The other wireless devices 104₁, 104₃ . . . 104ₙ can also be configured in a similar manner to perform method 1500.

Figure 16:
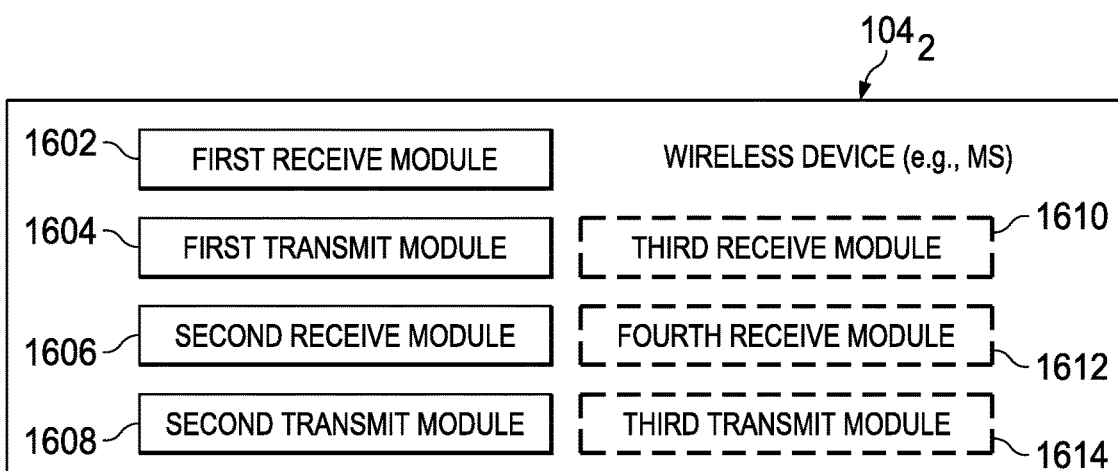
FIG. 16 is a block diagram illustrating an exemplary structure of the wireless device shown in FIG. 12 in accordance with an embodiment of the present disclosure.

Referring to FIG. 16, there is a block diagram illustrating structures of an exemplary wireless device 104₂ (for example) configured in accordance with an embodiment of the present disclosure. In one embodiment, the wireless device 104₂ may comprise a first receive module 1602, a first transmit module 1604, a second receive module 1606, a second transmit module 1608, a third receive module 1610, a fourth receive module 1612, and a third transmit module 1116. The wireless device 104₂ may also include other components, modules or structures which are well-known, but for clarity, only the components, modules or structures needed to describe the features of the present disclosure are described herein.

The first receive module 1602 can be configured to receive one or more repetitions of the page message 1206 from the RAN node 102₂ (see FIG. 12's step 2 for additional details). The number of repetitions of the page message 1206 is based on the DL coverage class.

The first transmit module 1604 can be configured to transmit one or more repetitions of the access request message 1208 to the RAN node 102₂ (see FIG. 12's step 3 for additional details). The access request message 1208 requests resources for sending a Page Response message 1212 and includes an indication ($N_{TX,\ DL}$) of a DL coverage class. The number of repetitions of the access request message 1208 is based on the UL coverage class.

The second receive module 1606 can be configured to receive one or more repetitions of the uplink assignment message 1210 from the RAN node 102₂ (see FIG. 12's step 4 for additional details). The uplink assignment message 1210 can comprise: (a) an indication of a number of pre-allocated radio block(s) on a packet data traffic channel; (b) an indication ($N_{TX,\ UL}$) of an UL coverage class; (c) an indication ($N_{TX,\ DL}$) of a DL coverage class; and (d) an indication of starting point of the pre-allocated radio blocks that the wireless device 104₂ is to use to transmit the page response message 1212 to the RAN node 102₂. The number of repetitions of the uplink assignment message 1210 is based on the DL coverage class.

The second transmit module 1608 can be configured to transmit one or more repetitions of the page response message 1212 to the RAN node 102₂ (see FIG. 12's step 5 for additional details). The page response message 1212 can comprise: uplink payload (e.g., a dummy LLC PDU), where the uplink payload is received in the pre-allocated radio block(s). The page response message 1212 is repeated according to the UL coverage class.

The third receive module 1610 can be configured to receive one or more repetitions of the first acknowledgment message 1214 (e.g., PUAN message 1214) from the RAN node 102₂ (see FIG. 12's step 6 for additional details). The first acknowledgment message 1214 can comprise: (a) a DL TBF resource assignment message 1215; (b) an indication where the wireless device 104₂ is to start looking for RLC data blocks 1202₁, 1202₂, 1202₃ . . . 1202ₓ thereon according to a DRX cycle after first waiting a certain time period (e.g., as indicated by the information within the first acknowledgment message 1214); (c) a first bitmap indicating receipt of the page response message 1212 by the RAN node 102₂ and (d) an indication ($N_{TX,\ DL}$) of a DL coverage class. The number of repetitions of the first acknowledgment message 1214 is based on the DL coverage class.

The fourth receive module 1612 can be configured to receive from the RAN node 102₂ one or more repetitions of each of the data blocks 1202₁, 1202₂ . . . 1202ₓ using the assigned DL resources (see FIG. 12's step 10 for additional details). The number of repetitions of each of the data blocks 1202₁, 1202₂ . . . 1202ₓ is based on the DL coverage class. Further, all repetitions of each of the data blocks 1202₁, 1202₂ . . . 1202ₓ are received contiguously by the wireless device 104₂, and each of the data blocks 1202₁, 1202₂ . . . 1202ₓ does not need to be received contiguously with respect to one another by the wireless device 104₂.

The third transmit module 1614 can be configured to transmit one or more repetitions of the second acknowledgment message 1220 (e.g., PDAN message 1220) to the RAN node 102₂ (see FIG. 12's step 11 for additional details). The second acknowledgment message 1220 comprises: a second bitmap indicating receipt of the data blocks 1202₁, 1202₂ . . . 1202ₓ by the wireless device 104₂. The number of repetitions of the second acknowledgment message 1220 is based on the UL coverage class. The other wireless devices 104₁, 104₃ . . . 104ₙ can also be configured in a similar manner to perform method 1500.

As those skilled in the art will appreciate, the above-described modules 1602, 1604, 1606, 1608, 1610, 1612, and 1614 of the wireless device 104₂ (e.g., MS 104₂) may be implemented separately as suitable dedicated circuits. Further, the modules 1602, 1604, 1606, 1608, 1610, 1612, and 1614 can also be implemented using any number of dedicated circuits through functional combination or separation. In some embodiments, the modules 1602, 1604, 1606, 1608, 1610, 1612, and 1614 may be even combined in a single application specific integrated circuit (ASIC). As an alternative software-based implementation, the wireless device 104₂ may comprise a memory 120₂, a processor 118₂ (including but not limited to a microprocessor, a microcontroller or a Digital Signal Processor (DSP), etc.) and a transceiver 110₂. The memory 120₂ stores machine-readable program code executable by the processor 118₂ to cause the wireless device 104₂ to perform the steps of the above-described method 1500. It should be appreciated that the other wireless devices 104₁, 104₃ . . . 104ₙ can also be configured in a similar manner as the wireless device 104₂ to perform method 1500.

Normal Coverage Wireless Devices

USF-based scheduling as per current GSM operation can be used for wireless devices 104₃ (for example) in normal coverage, thereby allowing the USF to be included within DL radio blocks 202₁, 202₂ . . . 202ₓ transmitted on the EC-PDTCH/EC-PACCH to the wireless devices 104₂, 104₄ . . . 104ₙ (for example) in extended coverage so the USF can still be used by the wireless devices 104₃ (for example) in normal coverage to schedule UL transmissions. The features of UL scheduling are summarized in TABLE #4 below.

TABLE #4

Uplink Scheduling Features

| DL Coverage Class (receiver of data) | UL Coverage Class (sender of data) | UL based scheduling principle |
|---|---|---|
| Normal | Normal | USF or Fixed UL Allocation |
| Normal | Extended | USF or Fixed UL allocation |

TABLE #4-continued

Uplink Scheduling Features

| DL Coverage Class (receiver of data) | UL Coverage Class (sender of data) | UL based scheduling principle |
|---|---|---|
| Extended | Normal | Fixed Uplink Allocation |
| Extended | Extended | Fixed UL allocation |

SUMMARY

The features of the Fixed Uplink Allocation (FUA) technique and the Flexible Downlink Allocation (FDA) technique as described herein are proposed for supporting EC-GSM wireless devices $104_1$, $104_2$, $104_3$ ... $104_n$.

The Fixed Uplink Allocation technique allows for uplink transmissions from EC-GSM wireless devices $104_1$, $104_2$, $104_3$ ... $104_n$ (normal or extended coverage classes) on the same Packet Data Traffic Channel (PDTCH) resources used to serve legacy wireless devices. The use of USF-based uplink transmission is not practical for wireless devices in extended coverage as it would impose the restriction of scheduling uplink transmissions from a wireless device of a certain coverage class while simultaneously sending downlink payload to a wireless device of the same coverage class.

The Flexible Downlink Allocation technique allows for downlink transmissions to EC-GSM devices $104_1$, $104_2$, $104_3$ ... $104_n$ (normal or extended coverage classes) on the same PDTCH resources used to serve legacy wireless devices by keeping the Temporary Flow Identity (TFI) field in the same location in all downlink radio block headers regardless of if the radio block is sent to a legacy wireless device or an EC-GSM wireless device $104_1$, $104_2$, $104_3$ ... $104_n$.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A radio access network (RAN) node configured to interact with a core network (CN) node and a wireless device, the RAN node comprising:
   a processor; and,
   a memory that stores processor-executable instructions, wherein the processor interfaces with the memory to execute the processor-executable instructions, whereby the RAN node is operable to:
   receive, from the CN node, a paging request message associated with the wireless device;
   transmit, to the wireless device, one or more repetitions of a page message;
   receive, from the wireless device, one or more repetitions of an access request message requesting resources for transmitting a page response message;
   transmit, to the wireless device, one or more repetitions of an uplink assignment message, wherein the uplink assignment message comprises:
      an indication of a number of pre-allocated radio block(s) on a packet data traffic channel; and
      an indication ($N_{TX, UL}$) of an Uplink (UL) coverage class; and
   receive, from the wireless device, one or more repetitions of a page response message, wherein the page response message comprises:
      uplink payload, wherein the uplink payload is received in the pre-allocated radio block(s), and wherein the page response message is repeated according to the UL coverage class.

2. The RAN node of claim 1, wherein the RAN node is further operable to:
   transmit, to the wireless device, one or more repetitions of a first acknowledgment message, wherein the first acknowledgment message comprises at least:
      a first bitmap indicating receipt of the page response message;
   transmit, to the CN node, a paging response message;
   receive, from the CN node, a Protocol Data Unit (PDU) including downlink payload;
   disassemble the PDU into one or more data blocks;
   transmit, to the wireless device, one or more repetitions of a downlink assignment message, wherein the downlink assignment message comprises:
      an indication of assigned Downlink (DL) resources on the packet data traffic channel;
   transmit, to the wireless device, one or more repetitions of each of the data blocks using the assigned DL resources; and
   receive, from the wireless device, one or more repetitions of a second acknowledgment message, wherein the second acknowledgment message comprises:
      a second bitmap indicating receipt of the data blocks.

3. The RAN node of claim 2, wherein the downlink assignment message further comprises:

an indication ($N_{TX, DL}$) of a Downlink (DL) coverage class; and an indication of when the wireless device is to start looking for a first data block from the RAN node.

4. The RAN node of claim 2, wherein all repetitions of each of the data blocks are transmitted contiguously to the wireless device, and wherein each of the data blocks does not need to be transmitted contiguously with respect to one another to the wireless device.

5. The RAN node of claim 1, wherein the RAN node is further operable to:

transmit, to the wireless device, one or more repetitions of a first acknowledgment message, wherein the first acknowledgment message comprises at least:
 a first bitmap indicating receipt of the page response message; and
 a Downlink (DL) Temporary Block Flow (TBF) resource assignment message;
transmit, to the CN node, a paging response message;
receive, from the CN node, a Protocol Data Unit (PDU) including downlink payload;
disassemble the PDU into one or more data blocks;
transmit, to the wireless device, one or more repetitions of each of the data blocks on the packet data traffic channel using DL resources indicated in the DL TBF resource assignment message; and
receive, from the wireless device, one or more repetitions of a second acknowledgment message, wherein the second acknowledgment message comprises:
 a second bitmap indicating receipt of the data blocks.

6. The RAN node of claim 5, wherein all repetitions of each of the data blocks are transmitted contiguously to the wireless device, and wherein each of the data blocks does not need to be transmitted contiguously with respect to one another to the wireless device.

7. A method in a radio access network (RAN) node configured to interact with a core network (CN) node and a wireless device, the method comprising:

receiving, from the CN node, a paging request message associated with the wireless device;
transmitting, to the wireless device, one or more repetitions of a page message;
receiving, from the wireless device, one or more repetitions of an access request message requesting resources for transmitting a page response message;
transmitting, to the wireless device, one or more repetitions of an uplink assignment message, wherein the uplink assignment message comprises:
 an indication of a number of pre-allocated radio block(s) on a packet data traffic channel; and
 an indication ($N_{TX, UL}$) of an Uplink (UL) coverage class; and
receiving, from the wireless device, one or more repetitions of a page response message, wherein the page response message comprises:
 uplink payload, wherein the uplink payload is received in the pre-allocated radio block(s), and wherein the page response message is repeated according to the UL coverage class.

8. The method of claim 7, further comprising:

transmitting, to the wireless device, one or more repetitions of a first acknowledgment message, wherein the first acknowledgment message comprises at least:
 a first bitmap indicating receipt of the page response message;

and
 a Downlink (DL) Temporary Block Flow (TBF) resource assignment message;
transmitting, to the CN node, a paging response message;
receiving, from the CN node, a Protocol Data Unit (PDU) including downlink payload;
disassembling the PDU into one or more data blocks;
transmitting, to the wireless device, one or more repetitions of a downlink assignment message, wherein the downlink assignment message comprises:
 an indication of assigned Downlink (DL) resources on the packet data traffic channel;
transmitting, to the wireless device, one or more repetitions of each of the data blocks using the assigned DL resources; and
receiving, from the wireless device, one or more repetitions of a second acknowledgment message, wherein the second acknowledgment message comprises:
 a second bitmap indicating receipt of the data blocks.

9. The method of claim 8, wherein the downlink assignment message further comprises:

an indication ($N_{TX, DL}$) of a Downlink (DL) coverage class; and
an indication of when the wireless device is to start looking for a first data block from the RAN node.

10. The method of claim 8, wherein all repetitions of each of the data blocks are transmitted contiguously to the wireless device, and wherein each of the data blocks does not need to be transmitted contiguously with respect to one another to the wireless device.

11. The method of claim 7, further comprising:

transmitting, to the wireless device, one or more repetitions of a first acknowledgment message, wherein the first acknowledgment message comprises at least:
 a first bitmap indicating receipt of the page response message; and
 a Downlink (DL) Temporary Block Flow (TBF) resource assignment message;
transmitting, to the CN node, a paging response message;
receiving, from the CN node, a Protocol Data Unit (PDU) including downlink payload;
disassembling the PDU into one or more data blocks;
transmitting, to the wireless device, one or more repetitions of each of the data blocks on the packet data traffic channel using DL resources indicated in the DL TBF resource assignment message; and
receiving, from the wireless device, one or more repetitions of a second acknowledgment message, wherein the second acknowledgment message comprises:
 a second bitmap indicating receipt of the data blocks.

12. The method of claim 11, wherein all repetitions of each of the data blocks are transmitted contiguously to the wireless device, and wherein each of the data blocks does not need to be transmitted contiguously with respect to one another to the wireless device.

13. A wireless device configured to interact with a radio access network (RAN) node, the wireless device comprising:

a processor; and,
a memory that stores processor-executable instructions, wherein the processor interfaces with the memory to execute the processor-executable instructions, whereby the wireless device is operable to:
receive, from the RAN node, one or more repetitions of a page message;
transmit, to the RAN node, one or more repetitions of an access request message requesting resources for transmitting a page response message;
receive, from the RAN node, one or more repetitions of an uplink assignment message, wherein the uplink assignment message comprises at least:

an indication of a number of pre-allocated radio block(s); and an indication ($N_{TX,\ UL}$) of an Uplink (UL) coverage class; and transmit, to the RAN node, one or more repetitions of a page response message, wherein the page response message comprises:

uplink payload, wherein the uplink payload is transmitted in the pre-allocated radio block(s), and wherein the page response message is repeated according to the UL coverage class.

14. The wireless device of claim 13, wherein the wireless device is further operable to:

receive, from the RAN node, one or more repetitions of a first acknowledgment message, wherein the first acknowledgment message comprises at least:

a first bitmap indicating receipt of the page response message;

receive, from the RAN node, one or more repetitions of a downlink assignment message, wherein the downlink assignment message comprises:

an indication of assigned Downlink (DL) resources;

receive, from the RAN node, one or more repetitions of one or more data blocks using the assigned DL resources;

transmit, to the RAN node, one or more repetitions of a second acknowledgment message, wherein the second acknowledgment message comprises:

a second bitmap indicating receipt of the one or more data blocks.

15. The wireless device of claim 14, wherein the downlink assignment message further comprises:

an indication ($N_{TX,\ DL}$) of a Downlink (DL) coverage class; and an indication of when the wireless device is to start looking for a first data block from the RAN node.

16. The wireless device of claim 14, wherein all repetitions of each of the one or more data blocks are received contiguously by the wireless device, and wherein each of the one or more data blocks does not need to be received contiguously with respect to one another by the wireless device.

17. The wireless device of claim 13, wherein the wireless device is further operable to:

receive, from the RAN node, one or more repetitions of a first acknowledgment message, wherein the first acknowledgment message comprises at least:

a first bitmap indicating receipt of the page response message; and a Downlink (DL) Temporary Block Flow (TBF) resource assignment message;

receive, from the RAN node, one or more repetitions of one or more data blocks using DL resources indicated in the DL TBF resource assignment message;

transmit, to the RAN node, one or more repetitions of a second acknowledgment message, wherein the second acknowledgment message comprises:

a second bitmap indicating receipt of the one or more data blocks.

18. The wireless device of claim 17, wherein all repetitions of each of the one or more data blocks are received contiguously by the wireless device, and wherein each of the one or more data blocks does not need not to be received contiguously with respect to one another by the wireless device.

19. A method in a wireless device configured to interact with a radio access network (RAN) node, the method comprising:

receive, from the RAN node, one or more repetitions of a page message;

transmit, to the RAN node, one or more repetitions of an access request message requesting resources for transmitting a page response message;

receive, from the RAN node, one or more repetitions of an uplink assignment message, wherein the uplink assignment message comprises at least:

an indication of a number of pre-allocated radio block(s); and an indication ($N_{TX,\ UL}$) of an Uplink (UL) coverage class; and transmit, to the RAN node, one or more repetitions of a page response message, wherein the page response message comprises:

uplink payload, wherein the uplink payload is transmitted in the pre-allocated radio block(s), and wherein the page response message is repeated according to the UL coverage class.

20. The method of claim 19, further comprising:

receiving, from the RAN node, one or more repetitions of a first acknowledgment message, wherein the first acknowledgment message comprises at least:

a first bitmap indicating receipt of the page response message;

receiving, from the RAN node, one or more repetitions of a downlink assignment message, wherein the downlink assignment message comprises:

an indication of assigned Downlink (DL) resources;

receiving, from the RAN node, one or more repetitions of one or more data blocks using the assigned DL resources;

transmitting, to the RAN node, one or more repetitions of a second acknowledgment message, wherein the second acknowledgment message comprises:

a second bitmap indicating receipt of the one or more data blocks.

21. The method of claim 20, wherein the downlink assignment message further comprises:

an indication ($N_{TX,\ DL}$) of a Downlink (DL) coverage class; and an indication of when the wireless device is to start looking for a first data block from the RAN node.

22. The method of claim 20, wherein all repetitions of each of the one or more data blocks are received contiguously by the wireless device, and wherein each of the one or more data blocks does not need to be received contiguously with respect to one another by the wireless device.

23. The method of claim 19, further comprising:

receiving, from the RAN node, one or more repetitions of a first acknowledgment message, wherein the first acknowledgment message comprises at least:

a first bitmap indicating receipt of the page response message; and a Downlink (DL) Temporary Block Flow (TBF) resource assignment message;

receiving, from the RAN node, one or more repetitions of one or more data blocks using DL resources indicated in the DL TBF resource assignment message;

transmitting, to the RAN node, one or more repetitions of a second acknowledgment message, wherein the second acknowledgment message comprises:

a second bitmap indicating receipt of the one or more data blocks.

24. The method of claim 23, wherein all repetitions of each of the one or more data blocks are received contiguously by the wireless device, and wherein each of the one or more data blocks does not need not to be received contiguously with respect to one another by the wireless device.

* * * * *